(12) United States Patent
Saito

(10) Patent No.: US 11,880,620 B2
(45) Date of Patent: Jan. 23, 2024

(54) IMAGE FORMING APPARATUS CAPABLE OF OBTAINING AND PRINTING FILE STORED IN MANAGEMENT SYSTEM, CONTROL METHOD THEREFOR, AND STORAGE MEDIUM

(71) Applicant: CANON KABUSHIKI KAISHA, Tokyo (JP)

(72) Inventor: Takuya Saito, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/862,600

(22) Filed: Jul. 12, 2022

(65) Prior Publication Data

US 2023/0062188 A1 Mar. 2, 2023

(30) Foreign Application Priority Data

Aug. 24, 2021 (JP) .................................. 2021-136433

(51) Int. Cl.
  *G06F 3/12* (2006.01)
  *G09B 3/02* (2006.01)
  *G09B 19/02* (2006.01)

(52) U.S. Cl.
  CPC ............ *G06F 3/126* (2013.01); *G06F 3/1206* (2013.01); *G06F 3/1287* (2013.01); *G09B 3/02* (2013.01); *G09B 19/02* (2013.01)

(58) Field of Classification Search
  CPC ...... G06F 3/126; G06F 3/1206; G06F 3/1287; G09B 3/02; G09B 19/02
  See application file for complete search history.

(56) References Cited

U.S. PATENT DOCUMENTS

| | | | |
|---|---|---|---|
| 9,400,626 B2 | 7/2016 | Shiratori | |
| 2008/0112015 A1* | 5/2008 | Liu | H04N 1/00206 |
| | | | 358/402 |
| 2008/0239362 A1* | 10/2008 | Kasai | G06F 3/1205 |
| | | | 358/1.14 |
| 2009/0290186 A1* | 11/2009 | Rocas | G06F 3/1207 |
| | | | 358/1.15 |
| 2010/0151431 A1* | 6/2010 | Miller | G09B 5/00 |
| | | | 434/350 |
| 2011/0225290 A1* | 9/2011 | Kansal | H04L 67/1097 |
| | | | 709/224 |
| 2014/0279706 A1* | 9/2014 | Blasko | G06Q 30/0283 |
| | | | 358/1.18 |
| 2017/0193835 A1* | 7/2017 | Bonney-Ache | G09B 7/02 |
| 2021/0314460 A1* | 10/2021 | Bacalso | G06V 30/147 |

FOREIGN PATENT DOCUMENTS

JP 2015028673 A 2/2015

* cited by examiner

*Primary Examiner* — John R Wallace
(74) *Attorney, Agent, or Firm* — ROSSI, KIMMS & McDOWELL LLP

(57) ABSTRACT

An image forming apparatus that is capable of obtaining and printing a file stored in a management system, and makes it possible to perform printing with enhanced user convenience by improving coordination between the management system and the image forming apparatus. The image forming apparatus includes a printing unit, and a processor that causes the image forming apparatus to function as an obtaining unit that obtains post data relating to the file; and a print control unit that causes the printing unit to print the file and post information included in the post data obtained by the obtaining unit.

9 Claims, 27 Drawing Sheets

FIG. 8A

MULTIPLICATION ASSIGNMENT 1   NAME:

DEADLINE : XX/YY/ZZ

MULTIPLICATION ASSIGNMENT 1   NAME :

| ATTRIBUTE INFORMATION NAME | TYPE INFORMATION |
|---|---|
| CLASS ID | string |
| TITLE | string |
| TEXT | string |
| ATTACHED ITEM | object |
| SUBMISSION DEADLINE | date |
| STATUS | enum |

FIG. 11C

TIMETABLE FOR NEXT WEEK
3RD PERIOD CLASS ON MONDAY HAS CHANGED TO SCIENCE

TIMETABLE  3RD GRADE, CLASS 1

|   | | MON | TUE | WED | THU | FRI |
|---|---|---|---|---|---|---|
| 1 | x:xx ~ x:xx | JAPANESE | PHYSICAL EDUCATION | JAPANESE | JAPANESE | PHYSICAL EDUCATION |
| 2 | x:xx ~ x:xx | MATH | MUSIC | MATH | MATH | MUSIC |
| 3 | x:xx ~ xx:xx | SCIENCE | HOME ECONOMICS | SCIENCE | SOCIAL STUDIES | HOME ECONOMICS |
| 4 | xx:xx ~ xx:xx | SOCIAL STUDIES | SOCIAL STUDIES | DRAWING AND CRAFTS | SCIENCE | JAPANESE |
| xx:xx~xx:xx | | SCHOOL LUNCH·CLEANING·LUNCH BREAK | | | | |
| 5 | xx:xx ~ xx:xx | DRAWING AND CRAFTS | JAPANESE | PHYSICAL EDUCATION | DRAWING AND CRAFTS | MATH |
| 6 | xx:xx ~ xx:xx | MORAL EDUCATION | MORAL EDUCATION | CLASS ACTIVITIES | MORAL EDUCATION | |

IMAGE FORMING APPARATUS CAPABLE OF OBTAINING AND PRINTING FILE STORED IN MANAGEMENT SYSTEM, CONTROL METHOD THEREFOR, AND STORAGE MEDIUM

BACKGROUND OF THE INVENTION

Field of the Invention

The present invention relates to image forming apparatuses, control methods therefor, and storage media.

Description of the Related Art

Image forming apparatuses such as multifunction peripherals are capable of obtaining and printing files of image data. Nowadays, in education and related fields, there are cases where teachers record, in a management system, assignments to be submitted, timetables, and other documents to be distributed to students, and the students obtain them from the management system by themselves. Such a management system allows students, even in an online learning environment, to obtain necessary assignments, timetables, and other documents from the management system, join online classes based on the timetables, and submit the assignments through the management system.

Assignments distributed to students usually have respective submission deadlines like, for example, a math practice for which answers need to be checked. Furthermore, a timetable for online classes may be changed according to the circumstances. These require a teacher to inform students about submission deadlines for assignments and a change to a timetable for the online classes in addition to the assignment and the timetable.

For such communication, there are some management systems to which a submission deadline for an assignment and a changed timetable for online classes can be posted. Students can keep track of them by seeing what is posted on the management systems. Japanese Laid-Open Patent Publication (Kokai) No. 2015-028673 discloses a printing system that causes a printing apparatus to print post data when the post data is posted to a posting service such as a social networking service (SNS).

However, a submission deadline for an assignment is not typically printed on printed matter on which the assignment is printed. Receiving such printed matter on which a submission deadline for an assignment is not printed, students have to look for a post relating to the printed matter and see the submission deadline for the assignment by themselves. On the other hand, to ensure that a submission deadline for an assignment like a math practice is printed on corresponding printed matter, a teacher is required to update a file of the assignment so as to add the submission deadline. It is hard for teachers to do this for every printed matter.

SUMMARY OF THE INVENTION

The present invention has been made in view of the problems described above. The present invention provides a mechanism that makes it possible to perform printing with enhanced user convenience by improving coordination between a management system and an image forming apparatus.

According to an aspect of the invention, an image forming apparatus is capable of obtaining and printing a file stored in a management system, and includes a printing unit, and a processor. The processor causes the image forming apparatus to function as an obtaining unit that obtains post data relating to the file, and a print control unit that causes the printing unit to print the file and post information included in the post data obtained by the obtaining unit.

According to the present invention, printing with enhanced user convenience can be performed by improving coordination between the management system and the image forming apparatus.

Further features of the present invention will become apparent from the following description of exemplary embodiments with reference to the attached drawings.

BRIEF DESCRIPTION OF THE DRAWINGS

FIG. 8A is a view useful in explaining printed matter of a file of an assignment stored in the learning management system.

FIG. 8C is a view useful in explaining printed matter of a file of an assignment stored in the learning management system, printed together with information about a submission deadline for the assignment, which is included in the post information in the post data in FIG. 8B.

FIG. 8D is a view useful in explaining the correspondence between attributes and types of information that can be used for the post data in FIG. 8B.

FIG. 11C is a view useful in explaining printed matter of a file of a timetable stored in the learning management system, printed together with the post information in the post data in FIG. 11B.

FIG. 11E is a view useful in explaining a display screen for post information in post data relating to the file in FIG. 11D, which is viewable on the operation unit of the multifunction peripheral in FIG. 1.

DESCRIPTION OF THE EMBODIMENTS

Embodiments of the present invention will now be described in detail with reference to the drawings. Arrangements in embodiments described below, however, are just examples, and the scope of the prevent invention is not limited by the arrangements in the embodiments described below.

First Embodiment

Figure 1:
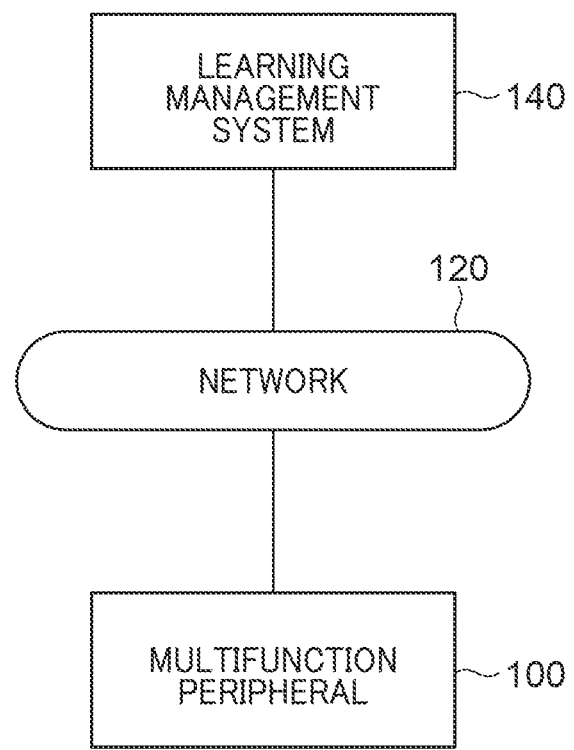
FIG. 1 is a system configuration diagram illustrating how a multifunction peripheral, which is an image forming apparatus according to a first embodiment, and a learning management system, which is capable of coordinating with the multifunction peripheral, are connected together.

FIG. 1 is a system configuration diagram illustrating how a multifunction peripheral 100 and a learning management system 140 are connected together, where the multifunction peripheral 100 is given as an image forming apparatus according to the first embodiment, and the learning management system 140 is capable of coordinating with the multifunction peripheral 100. In FIG. 1, the multifunction peripheral 100 and the learning management system 140 are connected together via a network 120. Here, the network 120 may include what is called the Internet, a telephone communication network, and so forth. It should be noted that computer terminals used by teachers and computer terminals used by students may be connected to the multifunction peripheral 100 and the learning management system 140 although they are not especially illustrated. The computer terminals may be either so-called personal computers or mobile terminals such as tablets. Teachers and students can use services, which are offered by the learning management system 140, by logging in to the learning management system 140 through the network 120. The learning management system 140 provides a function of, for example, recording and managing files of what is submitted and received by teachers and students such as assignments, work submitted for assignments, timetables for online classes, and other documents. The learning management system 140 may also provide a function of accumulatively storing and managing data of posts (post data) posted to a posting service such as a social networking service (SNS) for the purpose of, for example, communication between teachers and students. By using the services offered by the learning management system 140, teachers can communicate with students and give them assignments and receive submitted work for the assignments from the students. Teachers can also make preparations to deliver online classes at scheduled times based on a timetable stored in the learning management system 140.

Figure 2:
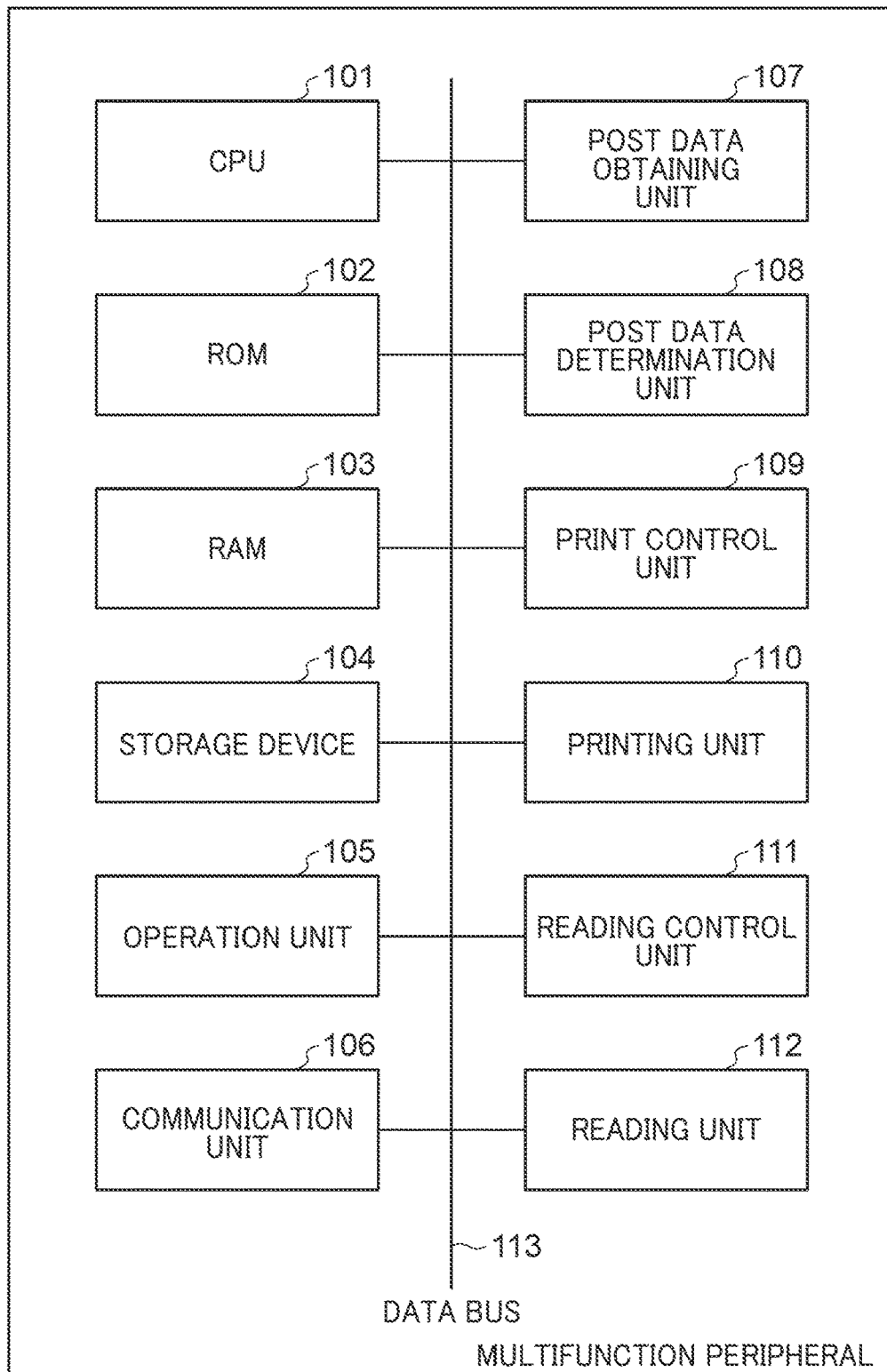
FIG. 2 is a view useful in explaining device configuration of the multifunction peripheral in FIG. 1.

FIG. 2 is a view useful in explaining a device configuration of the multifunction peripheral 100 in FIG. 1. The multifunction peripheral 100 in FIG. 2 includes a CPU 101, a ROM 102, a RAM 103, a storage device 104, an operation unit 105, a communication unit 106, a printing unit 110, a reading unit 112, and a data bus 113 to which they are connected. A post data obtaining unit 107, a post data determination unit 108, a print control unit 109, and a reading control unit 111, which operate under the control of the CPU 101, are connected to the data bus 113 of the multifunction peripheral 100 in FIG. 2. These functions may be implemented by the CPU 101.

The operation unit 105 is a user interface unit of the multifunction peripheral 100. The operation unit 105 includes, for example, a liquid crystal panel on which screens for user's operations and others are displayed. The operation unit 105 incudes, for example, a touch panel, a numeric keypad, a start button, and a stop button, and is configured to output operation data, which has been input through a user's operation performed on any of these components, to the CPU 101 via the data bus 113. The operation unit 105 may, for example, display a print setting screen on the liquid crystal panel and output operation data on settings configured by a user to the CPU 101. The operation unit 105 may output operation data for starting printing to the CPU 101 based on a user's operation performed on the start button.

The communication unit 106 is a communication interface unit of the multifunction peripheral 100, which interfaces with external apparatuses. The network 120 in FIG. 1 is connected to the communication unit 106. The communication unit 106 is capable of sending and receiving data to and from the learning management system 140, which is an external apparatus, via the network 120. The print control unit 109 is configured to cause the printing unit 110 to perform printing of print data, which is obtained by applying image processing based on print settings to image data that has been input. The printing unit 110, which is a print engine, is capable of printing print data on recording media such as sheets of paper based on print settings. The multifunction peripheral 100 can generate printed matter thereby. The reading unit 112 is capable of generating image data by reading originals based on settings. The reading control unit 111 is configured to control reading of originals by the reading unit 112 and process image data read by the reading unit 112 based on settings.

The post data obtaining unit 107 is configured to obtain post data to be used for printing and a file associated with or relating to the post data by receiving them from the learning management system 140. The post data obtained by the post data obtaining unit 107 includes information such as the title and the body (text) of a post on posting services. The post data may include information such as image data about the post and types of the post. The post data determination unit 108 is configured to determine a type of post data obtained by the post data obtaining unit 107 based on the obtained post data. The post data determination unit 108 may determine a type of post data based on, for example, a resource type of the post data, the title and the contents of the body of the post data, and so forth. The post data determination unit 108 may also determine additional information that is included in post data and is to be added to print data.

The storage device 104 can be nonvolatile, like an HDD. The storage device 104 can record image data, print data, and other data. The ROM 102 is, for example, a flash memory. The ROM 102 can record programs and data, which are to be used by the multifunction peripheral 100, in a nonvolatile manner. The RAM 103 is, for example, a volatile memory. The RAM 103 can temporarily record, for example, image data being processed and program control variables. The CPU 101 is a microcomputer. The CPU 101 is configured to load and execute programs stored in the ROM 102. This provides the multifunction machine 100 with a control unit that controls the overall operation of the multifunction peripheral 100.

Figure 3:
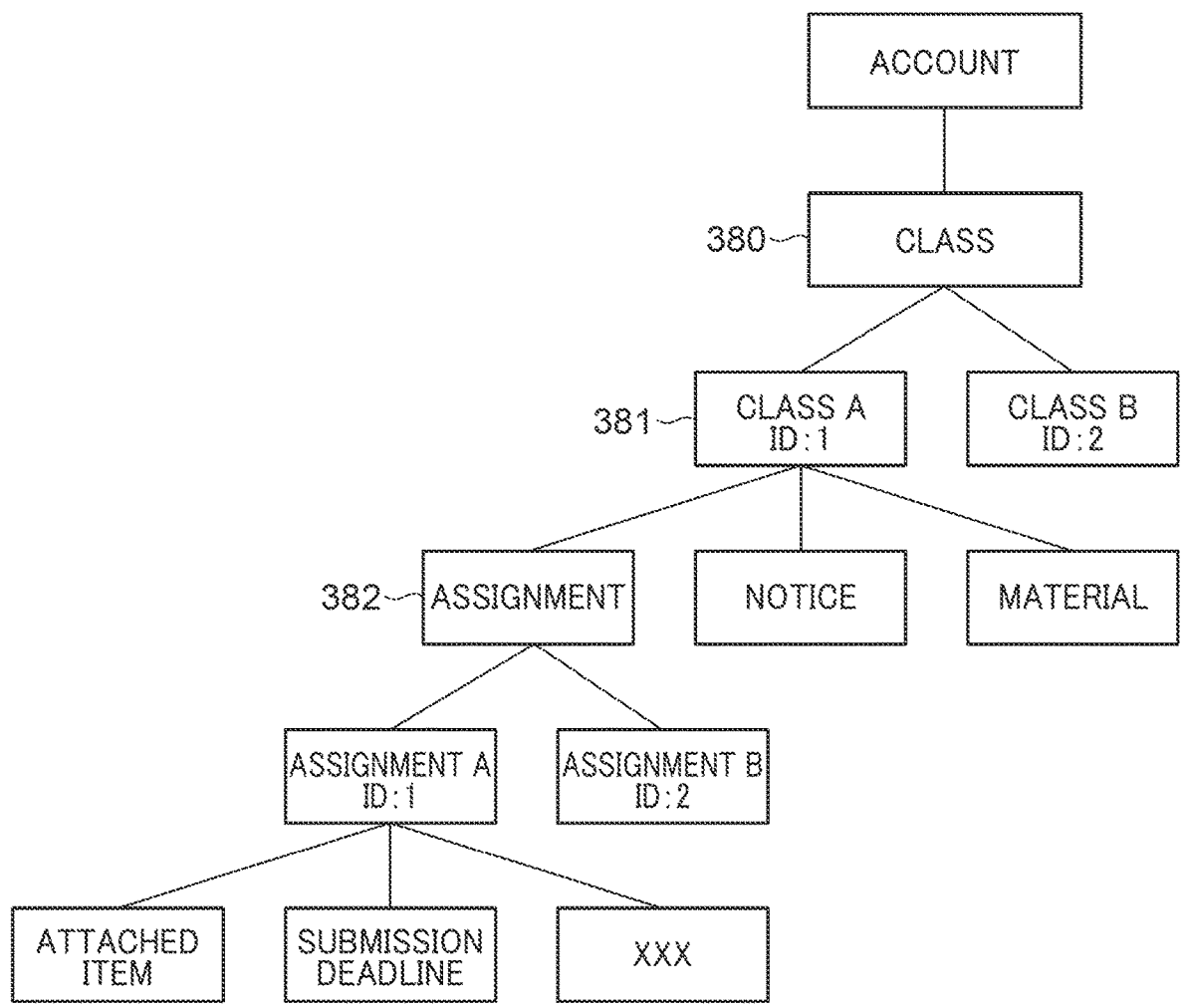
FIG. 3 is a view useful in explaining a data management structure in the learning management system.

FIG. 3 is a view useful in explaining a data management structure in the learning management system 140. The learning management system 140 is configured to manage data such as accumulated files using a hierarchical data structure. In the data management structure in FIG. 3, "Class" which is a first-layer class 380, the topmost layer, is associated with a user's account. A plurality of second-layer classes 381, "Class A ID: 1" and "Class B ID: 2", are associated with the first-layer class 380. A plurality of third-layer classes 382, "Assignment", "Notice", and "Material", are associated with the second-layer class 381. A plurality of post data files, "Assignment A ID: 1" and "Assignment B ID: 2", is stored under the third-layer class 382. The post data file of "Assignment A ID: 1" is comprised of, for example, an attached item (e.g., image data), text data (e.g., a submission deadline included in post data), and other information (XXX in the figure). It should be noted that the learning management system 140 may store the attached item like image data as a file separate from the post data file. Such image data may be handled with a URL indicating its storage location, associated with the file of the image data. In this case, to obtain a file of post data, first, the CPU 101 should obtain information about a storage location of the file of the target post data by repeatedly obtaining information in layers of the learning management system 140 from the top to the bottom in order. The CPU 101 thus can use information on the finally obtained storage location of the file of the target post data to send a request to obtain the post data to the learning management system 140 and obtain the file of the post data. In the example illustrated in FIG. 3, the CPU 101 sends a data obtaining request relating to layers under the first-layer class 380 to the learning management system 140 and obtains information on all of the second-layer classes 381 included in the first-layer class 380 as a response. The CPU 101 then sends a data obtaining request relating to layers under the second-layer class 381 to the learning management system 140 and obtains information on all of the third-layer classes 382 included in the second-layer class 381 as a response. After that, the CPU 101 sends a data obtaining request relating to layers under the third-layer class 382 to the learning management system 140 and obtains information on files of all of pieces of post data included in the third-layer class 382 as a response. The CPU 101 then sends information on storage locations of the files of the pieces of post data to the learning management system 140 and obtains the files of the pieces of post data.

Figure 4A:
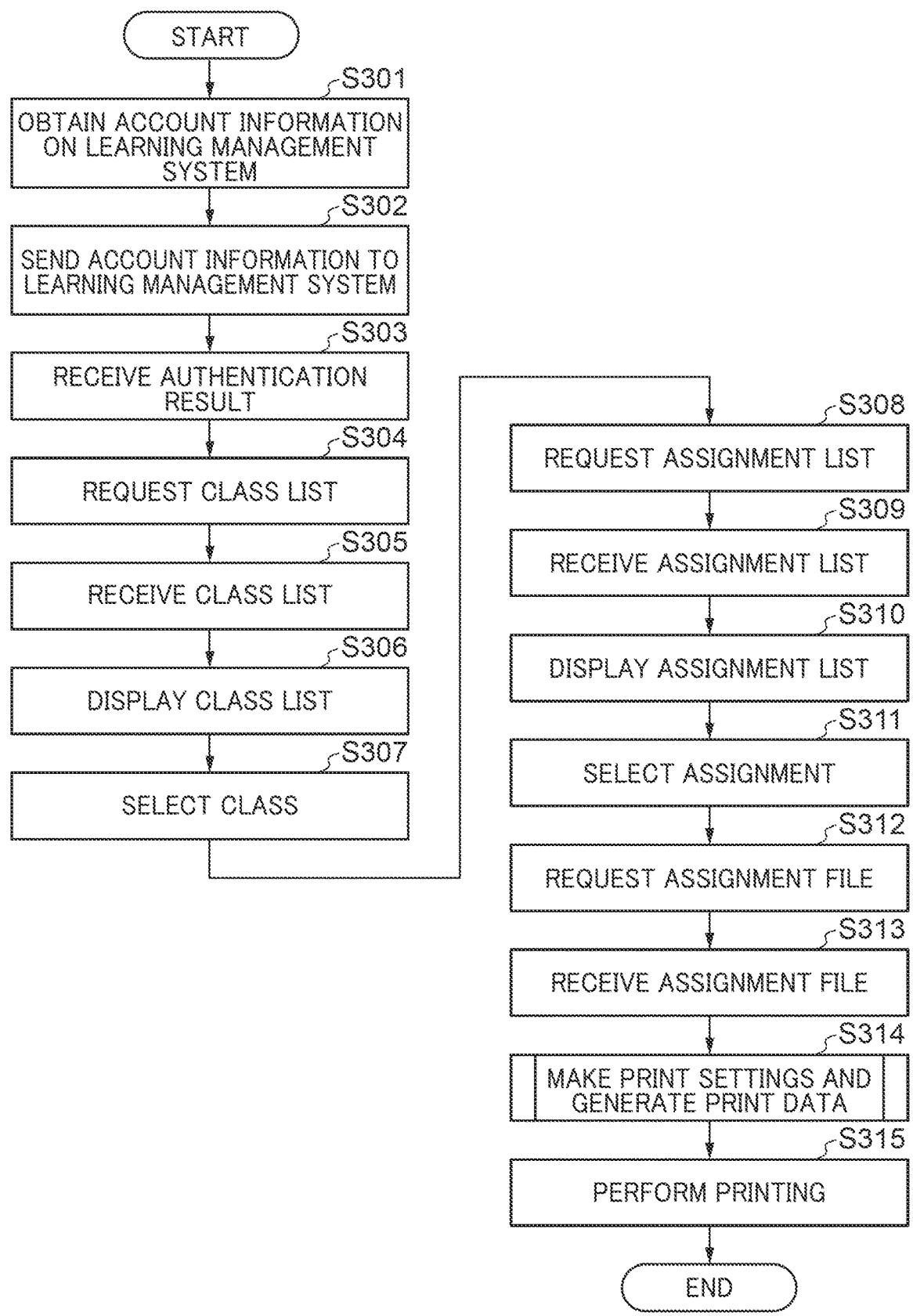
FIG. 4A is a flowchart of print control that is carried out by the multifunction peripheral in FIG. 1 in coordination with the learning management system.

FIG. 4A is a flowchart of print control that is carried out by the multifunction peripheral 100 in FIG. 1 in coordination with the learning management system 140. The CPU 101 of the multifunction peripheral 100 may perform the print control in FIG. 4A when performing printing in coordination with the learning management system 140.

Figure 4B:
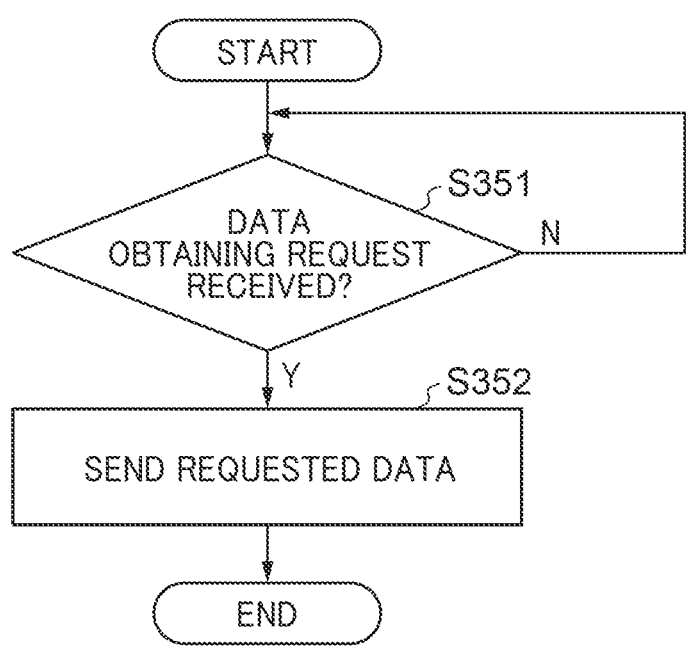
FIG. 4B is a flowchart of control that is carried out the learning management system, which is associated with the print control illustrated in FIG. 4A.

FIG. 4B is a flowchart of control that is carried out by the learning management system 140, which is associated with the print control illustrated in FIG. 4A. As with the multifunction peripheral 100 in FIG. 2 equipped with the CPU 101, the ROM 102, the RAM 103, the storage device 104, the communication unit 106, and the data bus 113, the learning management system 140 may be equipped with a CPU, a ROM, a RAM, a storage device, a communication unit, and a data bus to which they are connected. In this case, the CPU of the learning management system 140 repeatedly performs the control in FIG. 4B. In step S351, the CPU of the learning management system 140 determines, for example, whether or not the communication unit of the learning management system 140 has received a data obtaining request from the multifunction peripheral 100. When the data obtaining request has not been received, the CPU of the learning management system 140 repeatedly carries out the present process. When the CPU of the learning management system 140 determines that the data obtaining request has been received, the process proceeds to step S352. In the step S352, the CPU of the learning management system 140 obtains requested data or related data from the storage device of the learning management system 140 or another storage and sends it to a request source through the communication unit of the learning management system 140. After that, the CPU of the learning management system 140 ends the present control. Thus, the learning management system 140 can send required data to the multifunction peripheral 100.

Then, in step S301 in FIG. 4A, the CPU 101 of the multifunction peripheral 100 obtains account information on the learning management system 140. For example, the CPU 101 may obtain account information on the learning management system 140, which is associated with an account that has already logged in to the multifunction peripheral 100, from the storage device 104. The CPU 101 may also cause the operation unit 105 of the multifunction peripheral 100 to display a login screen, and based on a user's operation performed in the login screen displayed on the operation unit 105, obtain account information on the learning management system 140. In step S302, the CPU 101 sends the obtained account information to the learning management system 140 through the communication unit 106 of the multifunction peripheral 100. The learning management system 140 performs authentication of the user based on the account information received from the multifunction peripheral 100 and sends a result of the authentication to the multifunction peripheral 100. In step S303, the CPU 101 receives the result of the authentication for the account information. When the account information has been authenticated by the learning management system 140, in step S304, the CPU 101 sends a request to send a class list associated with the account to the learning management system 140 through the communication unit 106 of the multifunction peripheral 100. For such a send request, the CPU 101 may use the HTTP method. For example, when requesting transmission of information on the topmost class (380) in FIG. 3, the CPU 101 may send a send request including a text "GET/Class" to the learning management system 140 through the communication unit 106 of the multifunction peripheral 100. In step S305, the CPU 101 receives the class list which it requested.

In step S306, the CPU 101 causes the operation unit 105 to display the received class list. The CPU 101 causes the operation unit 105 to display all of the plurality of second-layer classes 381 included in the first-layer class 380 such that they are selectable. In step S307, the CPU 101 selects one class from among the plurality of second-layer classes 381 displayed on the operation unit 105, according to a user's operation performed on the operation unit 105. It should be noted that the CPU 101 may repeatedly carry out the processes in the steps S304 to S307 so as to sequentially select classes in lower layers of the data management structure in the learning management system 140. Step S308 is a process that is carried out in a case where the CPU 101 has selected a class of "Assignment" as a result of the selection in the step S307. In this case, the CPU 101 sends a request to send a list of data in a layer under the class 382 of "Assignment" to the learning management system 140 through the communication unit 106 of the multifunction peripheral 100. In step S309, the CPU 101 receives the requested list of data in the layer under the class 382 of "Assignment". A plurality of assignment files is stored under the class 382 of "Assignment". In step S310, the CPU 101 causes the operation unit 105 to display a list of the plurality of assignment files included in the received class 382 of "Assignment". The CPU 101 causes the operation unit 105 to display the plurality of assignment files such that they are selectable.

In step S311, the CPU 101 selects one assignment file from among the plurality of assignment files displayed on the operation unit 105, according to a user's operation performed on the operation unit 105. In step S312, the CPU 101 sends a request to send the assignment file (the file including data or image data on the selected assignment) to the learning management system 140 through the communication unit 106 of the multifunction peripheral 100. The learning management system 140 executes the processes in FIG. 4 to send data in the requested file of the assignment (and post data relating to the file of the assignment, if necessary) to the multifunction peripheral 100. In step S313, the CPU 101 receives the data in the requested file of the assignment from the learning management system 140. In step S314, the CPU 101 makes print settings for printing the received file of the assignment and generates print data for printing the file of the assignment. Here, the generated print data may include post information included in the received data and may be, for example, print data for the printing unit 110 to print additional information (such as a submission deadline) included in the post data relating to the assignment, together with image data on the assignment. The CPU 101 may configure settings on generation of print data and settings for the print control unit 109 and the printing unit 110. In step S315, the CPU 101 cause the printing unit 110 to print the print data. The CPU 101 may cause the printing unit 110 to perform printing, according to a user's operation performed on a print start button in the operation unit 105. As a result, the multifunction peripheral 100 obtains a file of an assignment stored in the learning management system 140 and causes the printing unit 110 to print the file of the assignment as an image on a recording medium such as a sheet of paper.

A description will now be given of a concrete example of coordination between the multifunction peripheral 100 and the learning management system 140, which are operating as illustrated in FIGS. 4A and 4B.

Figure 5:
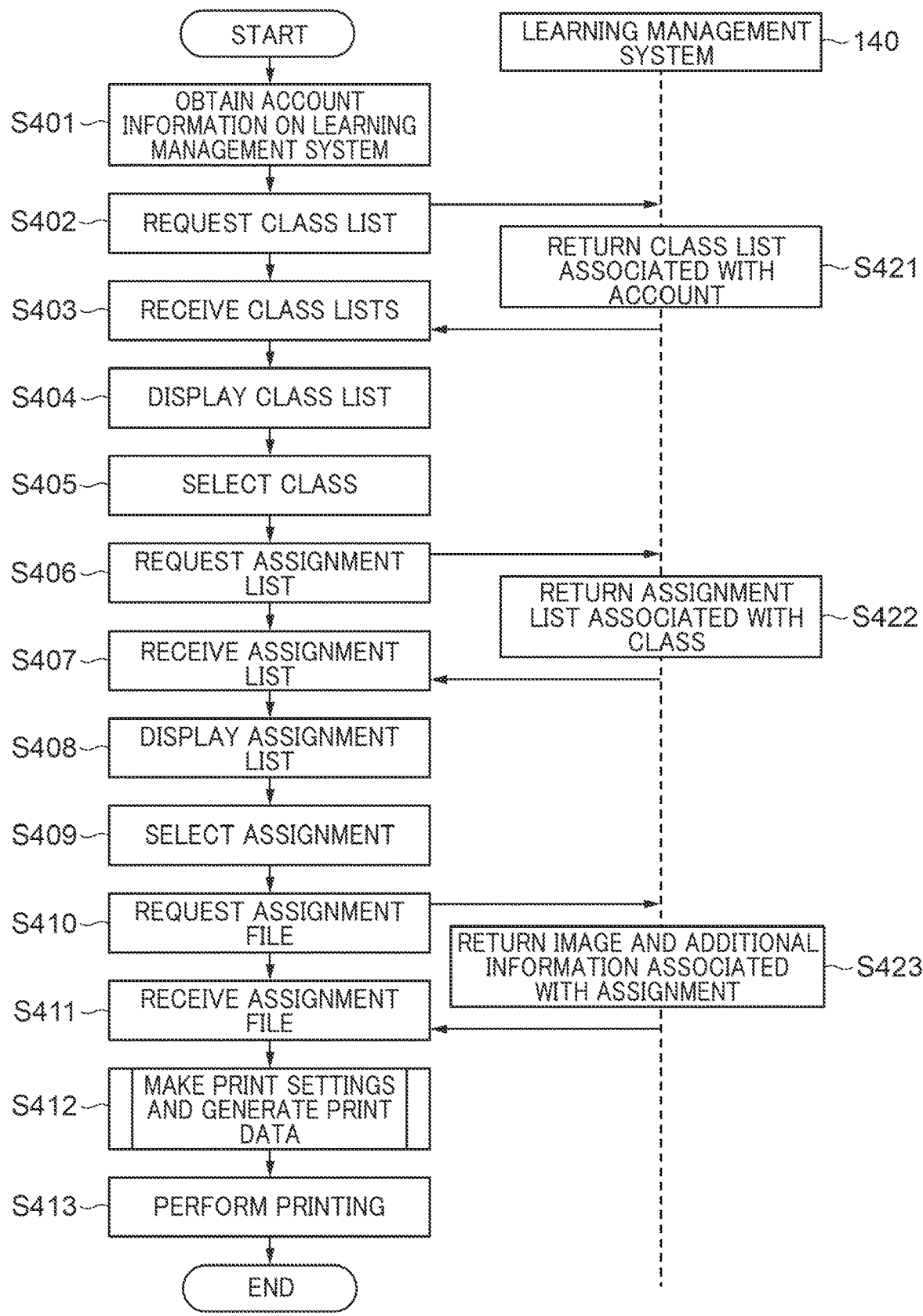
FIG. 5 is a flowchart of print control that is carried out by the multifunction peripheral in FIG. 1 in a case where pieces of post data and pieces of image data on assignments relating to respective pieces of post data are stored separately in the learning management system.

FIG. 5 is a flowchart of print control that is carried out by the multifunction peripheral 100 in FIG. 1 in a case where pieces of post data and pieces of image data on assignments relating to respective pieces of post data are stored separately in the learning management system 140. The CPU 101 of the multifunction peripheral 100 may perform the print control in the concrete example illustrated in FIG. 5 by basically performing the print control illustrated in FIG. 4A. It should be noted that FIG. 5 collectively illustrates processes carried out by the multifunction peripheral 100 in FIG. 1 and the learning management system 140 coordinating with the multifunction peripheral 100. In step S401 in FIG. 5, the CPU 101 of the multifunction peripheral 100 obtains account information on the learning management system 140. Based on the obtained account information, the CPU 101 of the multifunction peripheral 100 and the learning management system 140 perform authentication of a user who is using the multifunction peripheral 100. In step S402, the CPU 101 of the multifunction peripheral 100 sends a request to send a class list associated with the account to the learning management system 140. In step S421, the learning management system 140 sends the requested class list associated with the account through the control in FIG. 4B. In step S403, the CPU 101 receives the requested class list and causes the operation unit 105 to display the received class list. In step S405, the CPU 101 selects one class from the class list according to a user's operation performed on the operation unit 105, and in step S406, sends a request to send a class list of "Assignment" to the learning management system 140. In step S422, the learning management system 140 returns the requested class list of "Assignment" through the control in FIG. 4B. In step S407, the CPU 101 receives the requested class list, and in step S408, causes the operation unit 105 to display the received class list.

In step S409, the CPU 101 selects a file of an assignment from among a plurality of files of assignments displayed on the operation unit 105, according to a user's operation performed on the operation unit 105, and in step S410, sends a request to send the file of the assignment to the learning management system 140. In step S423, the learning management system 140 returns the requested file of the assignment through the control in FIG. 4B. The CPU 101 receives the requested file of the assignment in step S411. In the example illustrated in FIG. 5, the learning management system 140 stores pieces of image data on assignments relating to respective pieces of post data separately from the pieces of post data. The CPU 101 of the multifunction peripheral 100 obtains a storage location of a file of image data on an assignment from the corresponding post data and sends a request to send the file to the learning management system 140. In the step S423, the learning management system 140 returns image data and other data associated with the requested file of the assignment as the requested file of the assignment through the control in FIG. 4B. As a result, the CPU 101 of the multifunction peripheral 100 obtains the file of the image data on the assignment and the post data relating to it from the learning management system 140. After that, in step S412, the CPU 101 of the multifunction peripheral 100 makes print settings for printing the received file of the assignment and generates print data for printing the received file of the assignment (print data for printing the file of the assignment including post information included in the post data), and in step S413, causes the printing unit 110 to print the print data. As a result, the multifunction peripheral 100 separately obtains image data on a file of an assignment and information included in post data relating to the file and prints the image data and the information together with the printing unit 110.

Figure 6:
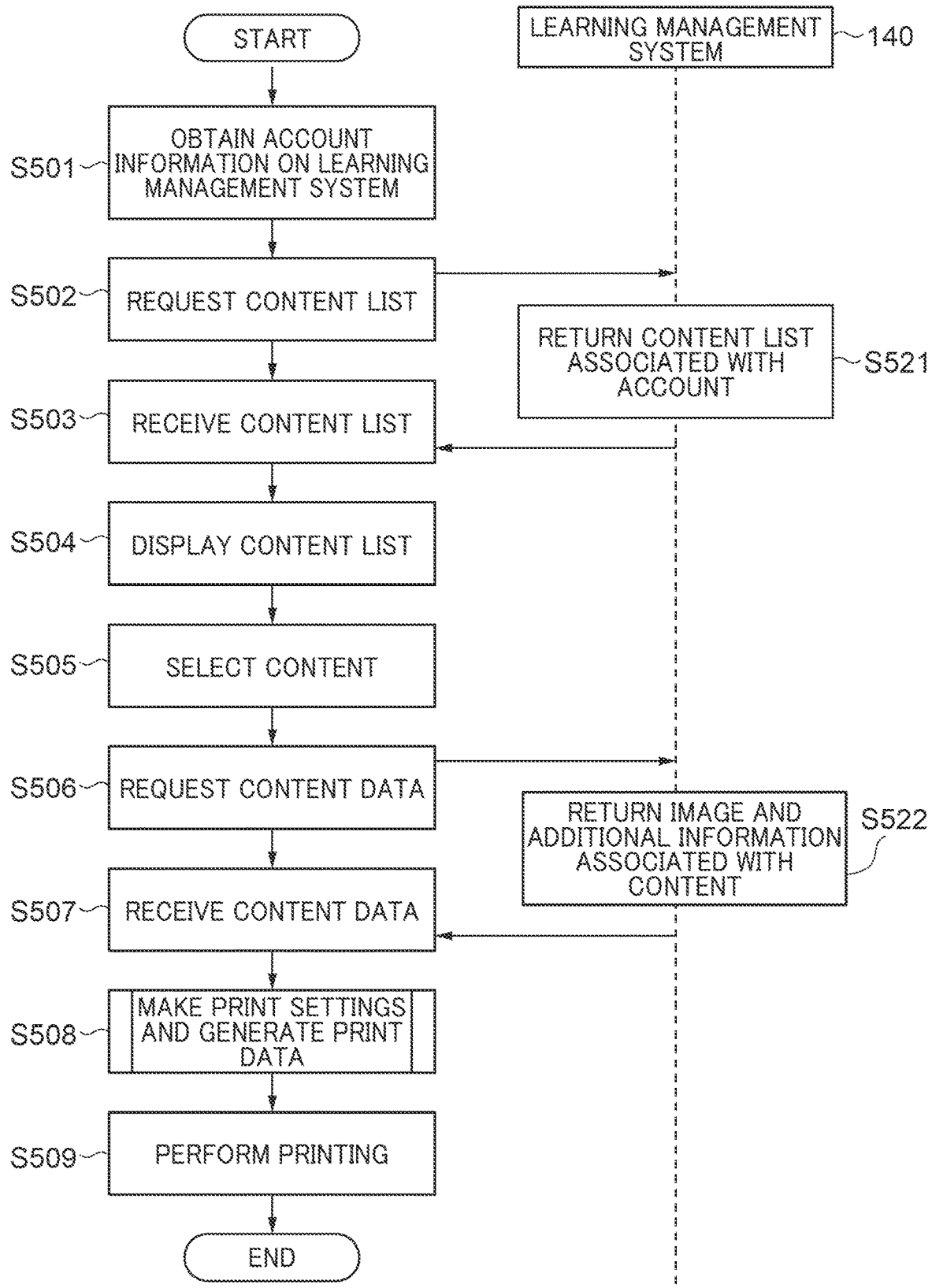
FIG. 6 is a flowchart of print control that is carried out by the multifunction peripheral in FIG. 1 in a case where pieces of image data on assignments relating to respective pieces of post data are stored as part of the pieces of post data in the learning management system.

FIG. 6 is a flowchart of print control that is carried out by the multifunction peripheral 100 in FIG. 1 in a case where pieces of image data on assignments relating to respective pieces of post data are stored as part of the pieces of post data in the learning management system 140. The CPU 101 of the multifunction peripheral 100 may perform the print control in a concrete example illustrated in FIG. 6 by basically performing the print control in FIG. 4A. It should be noted that FIG. 6 collectively illustrates processes carried out by the multifunction peripheral 100 in FIG. 1 and the learning management system 140 coordinating with the multifunction peripheral 100. In step S501 in FIG. 6, the CPU 101 of the multifunction peripheral 100 obtains account information on the learning management system 140. Based on the obtained account information, the CPU 101 of the multifunction peripheral 100 and the learning management system 140 perform authentication of a user who is using the multifunction peripheral 100. In step S502, the CPU 101 of the learning management system 140 sends a request to send a content list associated with the account to the learning management system 140. Here, contents may be a generic name for all of the third-layer classes 382 such as "Assignment", "Notice", and "Material" in FIG. 3. In step S521, the learning management system 140 returns the requested content list associated with the account through the control in FIG. 4B. The content list collectively includes all files in the third-layer classes 382 such as "Assignment", "Notice", and "Material" in FIG. 3. In step S503, the CPU 101 receives the requested content list, and, in step S504, the CPU 101 causes the operation unit 105 to display the received content list in list form. All of files of a plurality of contents classed as "Assignment", "Notice", and "Material" in FIG. 3 are displayed in list form on the operation unit 105 of the multifunction peripheral 100 such that they are selectable.

In step S505, the CPU 101 selects one content from the content list, according to a user's operation performed on the operation unit 105, and in step S506, sends a request to send data on the content to the learning management system 140. In step S522, the learning management system 140 returns image data and other data associated with the content as the requested data on the content through the control in FIG. 4B. In step S507, the CPU 101 receives the requested data on the content. In the example illustrated in FIG. 6, the learning management system 140 stores data on contents such as pieces of image data on assignments relating to respective post data as part of the piece of post data. By receiving the data on the content, the CPU 101 of the multifunction peripheral 100 obtains, for example, image data on an assignment and post data relating to it from the learning management system 140. After that, in step S508, the CPU 101 of the multifunction peripheral 100 makes print settings for printing the received data on the content (the image data on the assignment) and generates print data for printing the content (print data on the file of the assignment including post information included in the post data), and in step S509, causes the printing unit 110 to print the print data As a result, the multifunction peripheral 100 collectively obtains, as a content, image data on a file of an assignment and information included in post data relating to the file and print them together using the printing unit 110.

Figure 7A:
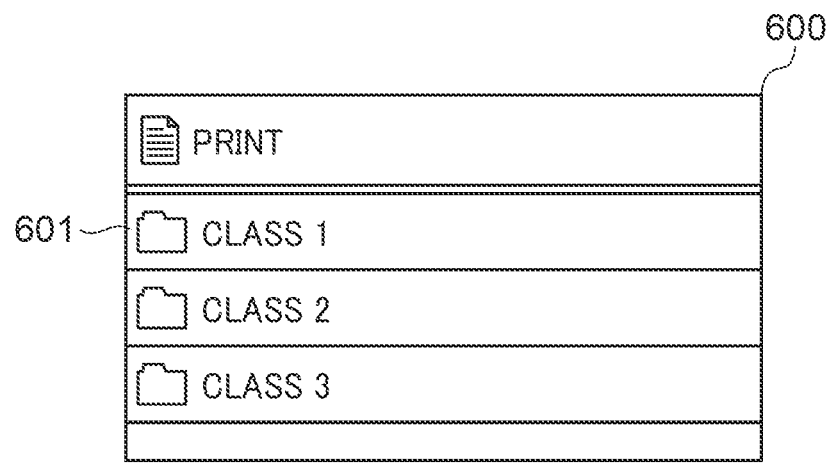
FIGS. 7A to 7D are views useful in explaining examples of a plurality of operation screens displayed on an operation unit of the multifunction peripheral in FIG. 1.
Figure 7B:
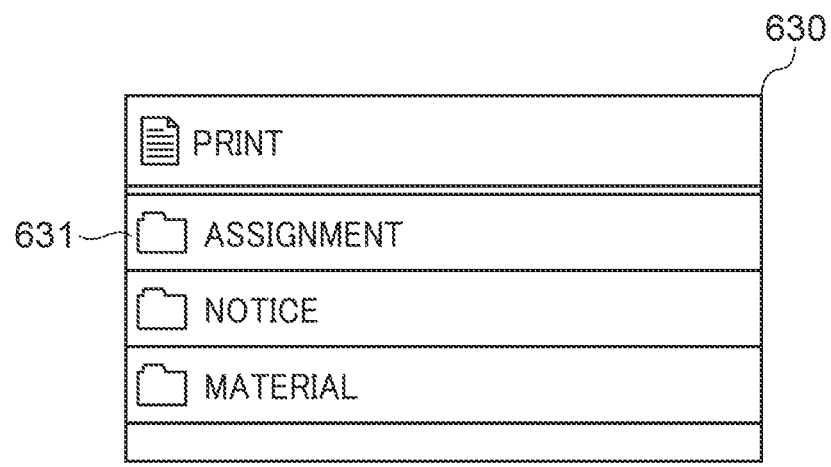
Figure 7C:
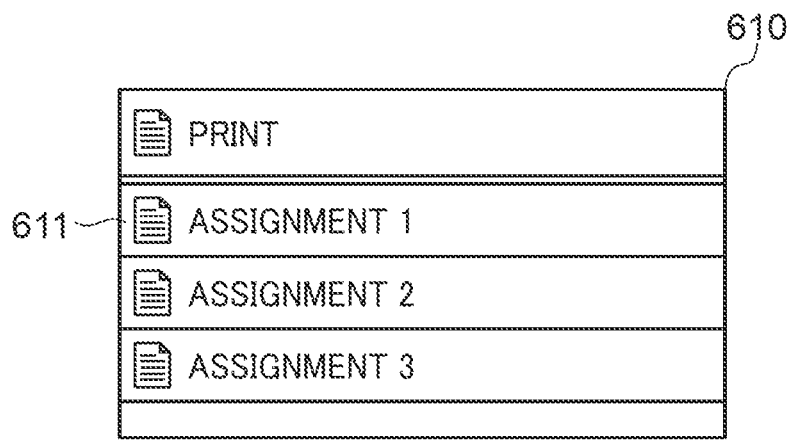
Figure 7D:
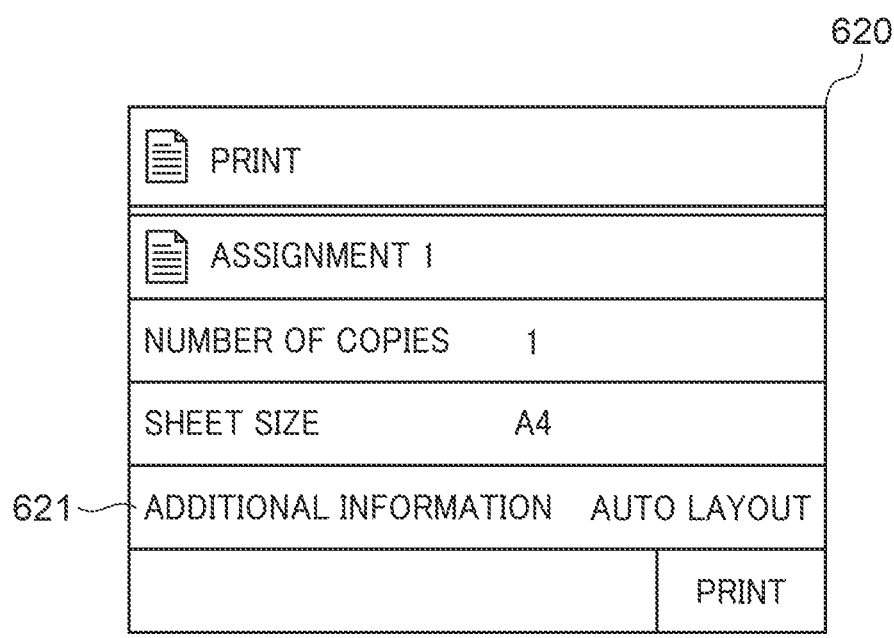

FIGS. 7A to 7D are views useful in explaining examples of a plurality of operation screens displayed on the operation unit 105 of the multifunction peripheral 100 in FIG. 1. FIGS. 7A to 7D illustrate a class selection screen 600, a content selection screen 630, an assignment selection screen 610, and a print setting screen 620, respectively. Upon obtaining information on the second-layer classes 381 included in the first-layer class 380, the CPU 101 causes the operation unit 105 to display the class selection screen 600. When a user selects a "Class 1" button 601 in the class selection screen 600 displayed on the operation unit 105, the CPU 101 obtains information on the third-layer classes 382 included in the class 381 corresponding to "Class 1" from the learning management system 140 and causes the operation unit 105 to display the obtained information. Thus, the content selection screen 630 is displayed on the operation unit 105. When a user selects an "Assignment" button 631 in the content selection screen 630 displayed on the operation unit 105, the CPU 101 obtains information on post data on assignments included in the class 382 corresponding to "Assignment" from the learning management system 140 and causes the operation unit 105 to display the obtained information. Thus, the assignment selection screen 610 is displayed on the operation unit 105. When a user operates the operation unit 105 to select an "Assignment 1" button 611 in the assignment selection screen 610, the CPU 101 obtains post data corresponding to "Assignment 1" from the learning management system 140 and causes the operation unit 105 to display the print setting screen 620. The print setting screen 620 includes a setting button 621 for layout of additional information. A user is allowed to, by operating the operation unit 105, select whether or not to automatically lay out additional information. When a print button is selected in a case where a setting that will automatically lay out additional information has been made as illustrated in FIG. 7D, the CPU 101 obtains lacking (necessary) additional information, which is image data or other data, from the learning management system 140, generates print data based on the setting, and performs printing using the printing unit 110. Thus, the CPU 101 of the multifunction peripheral 100 acts as an obtaining unit to obtain post data relating to a file stored in the learning management system 140. The CPU 101 also acts as a print data generating unit to generate, based on the setting, print data for printing the file, which includes post information included in post data relating to the file.

FIG. 8A is a view useful in explaining printed matter of a file of an assignment stored in the learning management system 140. The file of the assignment includes image data that represents the assignment. In a case where, for example, a setting that will not automatically lay out additional information has been made, the CPU 101 generates print data such that only the image data in the file of the assignment is printed. The CPU 101 then causes the printing unit 110 to print the generated print data, so that an image in FIG. 8A is printed on a recording medium such as a sheet of paper.

Figure 8B:
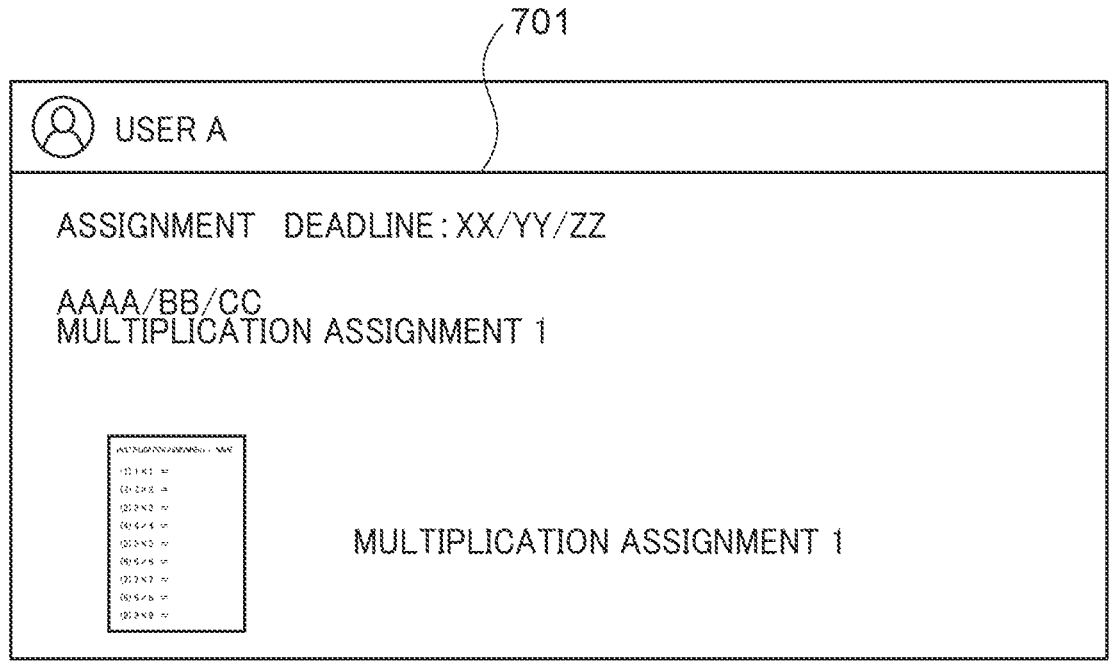
FIG. 8B is a view useful in explaining a display screen for post information in post data relating to the file in FIG. 8A, which is viewable on the operation unit of the multifunction peripheral in FIG. 1.

FIG. 8B is a view useful in explaining a display screen for post information in post data relating to the file of the assignment in FIG. 8A, which is viewable on the operation unit 105 of the multifunction peripheral 100 in FIG. 1. The display screen for post information in FIG. 8B includes pieces of post information in post data, which include a poster's name, a title indicating, for example, the contents of the assignment, "Multiplication Assignment 1", a text 701 of a submission deadline "XX/YY/ZZ" for the assignment; and a thumbnail image of a file attached to the post. The CPU 101 obtains the post data relating to the file of the assignment and causes the operation unit 105 to display the display screen for post information in FIG. 8B.

FIG. 8C is a view useful in explaining printed matter of the file of the assignment stored in the learning management system 140, printed together with information on the submission deadline for the assignment, which is included in the post information in the post data in FIG. 8B. In the case where the setting that will automatically lay out additional information has been made, the CPU 101 obtains a text 701 indicating the submission deadline for the assignment and generates print data for printing image data in the file of the assignment together with the obtained text. The CPU 101 causes the printing unit 110 to print the generated print data so that the image illustrated in FIG. 8C is printed on a recording medium such as a sheet of paper. As distinct from the printed matter in FIG. 8A, a header including the submission deadline for the assignment is printed at the upper right of the sheet of the printed matter in FIG. 8C.

FIG. 8D is a view useful in explaining a data structure of the post data in FIG. 8D. The post data in FIG. 8B may include data on multiple types of attribute information illustrated in FIG. 8D, together with data on their attribute information names. In an example illustrated in FIG. 8D, the attribute information names of pieces of attribute information in the post data include a class ID, title, text, attached item, submission deadline, and status. The class ID data can be, for example, an ID of a class with which the post data is associated. The post data about an assignment may include the ID of a class "Assignment". The class ID data may be written in the post data with a text string type. The title data is a title to be used when post information in post data is displayed. In the display screen for post information in FIG. 8B, "Multiplication Assignment 1" is displayed based on the title data. The title data may be written in the post data with a text string type. The text data is a text viewable on a screen. In the display screen for post information in FIG. 8B, "AAAA/BB/CC" is displayed based on the text data. The text data may be written in the post data with a text string type. The attached item data can be, for example, a file of printable image data relating to the post data. In the display screen for post information in FIG. 8B, a thumbnail image of the image data in the file and its file name are displayed based on the attached item data. The attached item data may be written in the post data with an object type.

The submission deadline data is used for an attached item such as an assignment to be submitted and may be written in the post data with a text string type. In the display screen for post information in FIG. 8B, "XX/YY/ZZ" that represents the deadline for the assignment is displayed based on the submission deadline data. The status data is used to manage the status of the post data and/or the attached image and may be written in the post data with an enumerated type such as numeric values. The status is not viewable in the display screen for post information in FIG. 8B. In this case, the CPU 101 can search the post data for the attribute information name "Submission Deadline" and extract a text "XX/YY/ZZ" following the attribute information name "Submission Deadline" so as to use it as the text data representing the date and time of the submission deadline. The CPU 101 acts as a print data generating unit to generate print data for printing a file of an assignment and add, to the print data, a header or page in which the submission deadline for the assignment is printed.

Figure 9A:
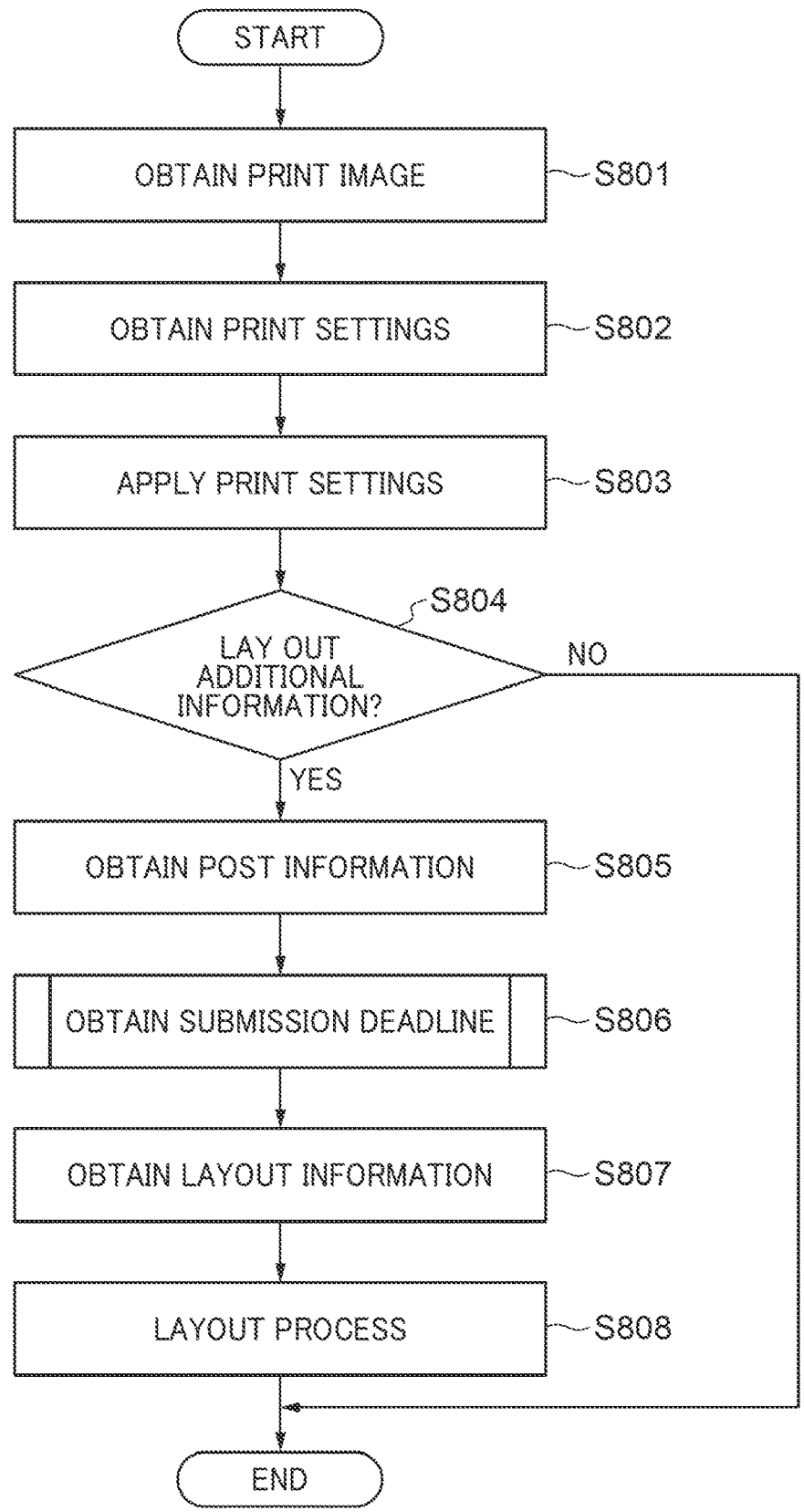
FIG. 9A is a flowchart of a print data generating process that is carried out by the multifunction peripheral in FIG. 1.

FIG. 9A is a flowchart of a print data generating process that is carried out by the multifunction peripheral 100 in FIG. 1. The CPU 101 of the multifunction peripheral 100 acts as a print data generating unit to carry out the print data generating process in FIG. 9A. The CPU 101 may carry out the print data generating process in FIG. 9A in a case where a setting that will lay out additional information such as a submission deadline for an assignment and print the additional information together with an image of the assignment has been made. The CPU 101 may also carry out the print data generating process in FIG. 9A in a case where a setting that will lay out additional information such as a submission deadline for an assignment and print the additional information together with as an image of the assignment has been made and in a case where a setting that will print an image of an assignment without laying out additional information has been made.

In step S801, the CPU 101, acting as the post data obtaining unit 107, obtains a file of image data associated with post data on an assignment, as a print image. In step S802, the CPU 101 obtains print setting information that has been configured through the print setting screen 620. In step S803, the CPU 101 processes, for example, the file of the image data on the assignment in accordance with the print settings for printing the file of the image data, and generates, for example, print data for the assignment as illustrated in FIG. 8B. In step S804, the CPU 101 determines whether or not the setting that will automatically lay out additional information has been made. When the CPU 101 determines that the setting that will automatically lay out additional information has been made, the process proceeds to step S805. When the setting that will automatically lay out additional information has not been made, the CPU 101 ends the present control. In this case, the print data includes only the image data on the assignment, and printed matter obtained by printing the print data is as illustrated in FIG. 8A. In step S805, the CPU 101 obtains information on the post data to be automatically laid out in the image data.

In step S806, the CPU 101 searches the obtained post data, and from the obtained post data, obtains text data on the submission deadline for the assignment as additional information to be automatically laid out. In step S807, the CPU 101 obtains setting information on a print layout for the submission deadline. In step S808, the CPU 101 adds the text data on the submission deadline for the assignment to the print data according to the obtained print layout setting. Thus, the CPU 101 can generate print data including the image data on the assignment and the submission deadline for the assignment, which is included in the post data. After that, the CPU 101 ends the present control. In this case, printed matter obtained by printing the print data is as illustrated in FIG. 8C. Thus, the CPU 101 can act as the print data generating unit to generate print data for a file, including post information included in post data. Also, when printing a file stored in the learning management system 140 using the printing unit 110, the CPU 101 can act as the print control unit 109t to cause the printing unit 110 to print the print data in the file, including the post information.

Figure 9B:
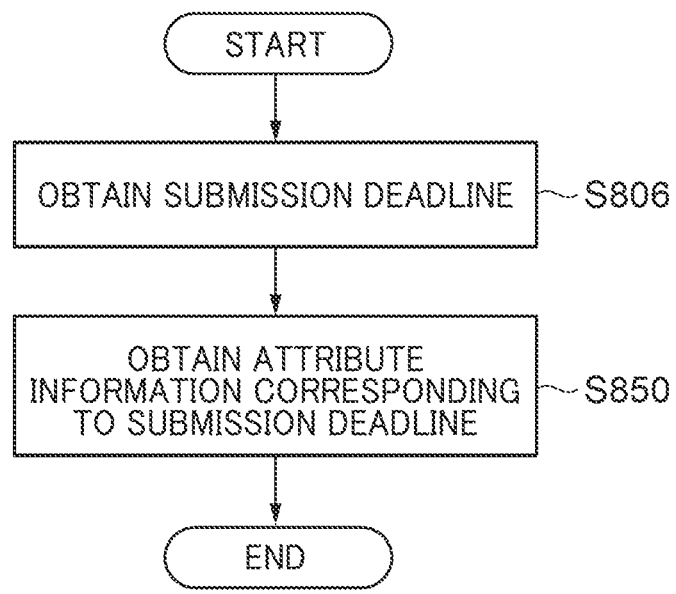
FIG. 9B is a flowchart illustrating a first example of a submission deadline obtaining process in FIG. 9A.

FIG. 9B is a flowchart illustrating a first example of a submission deadline obtaining process in FIG. 9A. The CPU 101 begins the submission deadline obtaining process in FIG. 9B with the process of step S806, of obtaining the assignment submission deadline, and then obtains attribute information corresponding to the submission deadline in step S850. For example, the CPU 101 can search the post data for an attribute information name "Submission Deadline" and extract a text "XX/YY/ZZ" following the attribute information name "Submission Deadline" as the attribute information that represents the date and time of the submission deadline. After the CPU 101 ends the submission deadline obtaining process, the process proceeds to the step S807.

Figure 9C:
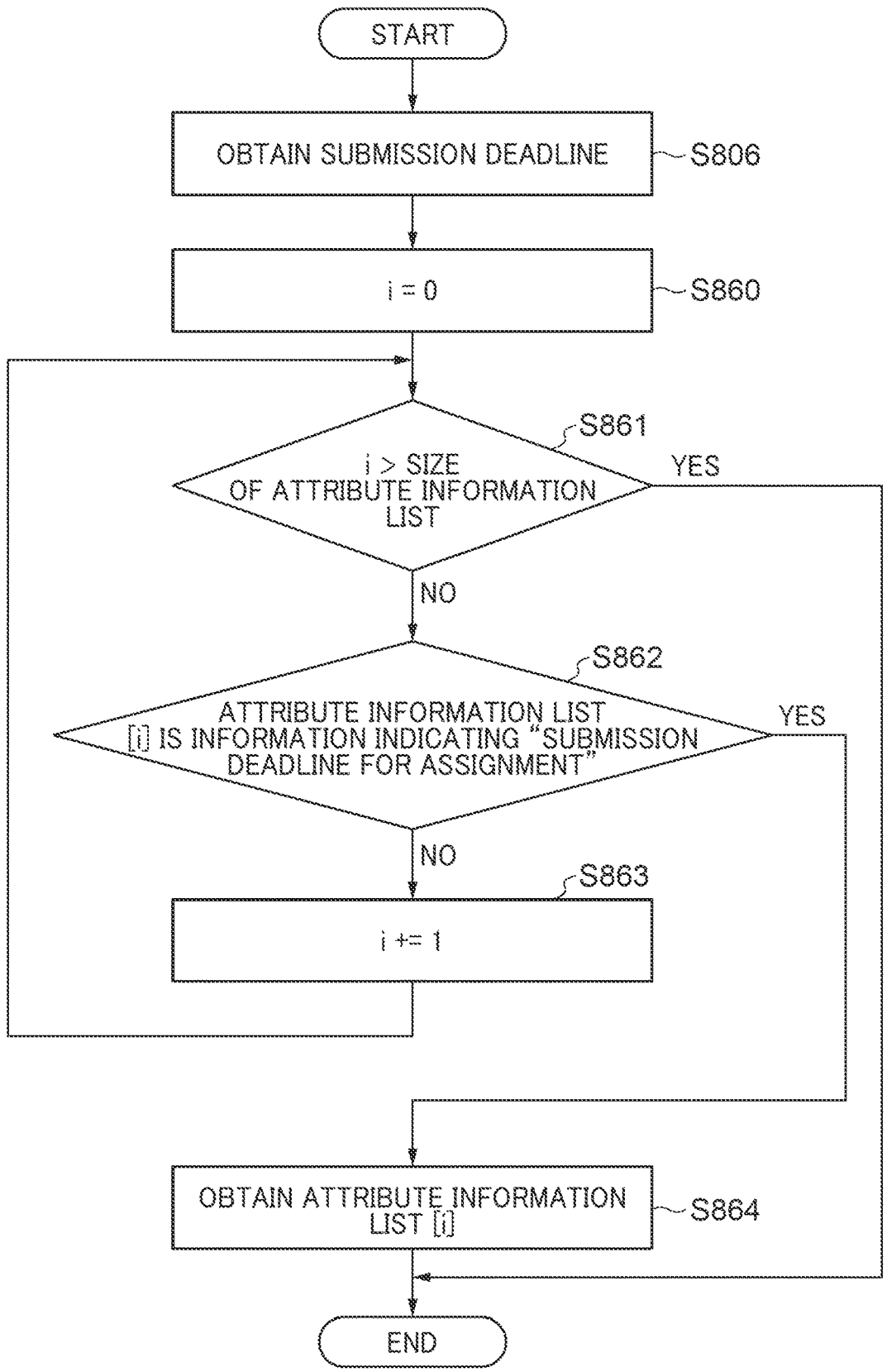
FIG. 9C is a flowchart illustrating a second example of the submission deadline obtaining process in FIG. 9A.

FIG. 9C is a flowchart illustrating a second example of the submission deadline obtaining process in FIG. 9A. The CPU 101 begins the submission deadline obtaining process in FIG. 9C with the process of step S806, of obtaining the assignment submission deadline, and then initializes a loop control variable i to 0 in step S860. In step S861, based on, for example, the attribute information list in FIG. 8D, the CPU 101 determines whether or not the loop control variable i is greater than a size of the attribute information list (the total number of lines). The attribute information list in FIG. 8D may be included in the post data. When the CPU 101 determines that the loop control variable i is not greater than the size of the attribute information list (the total number of lines) included in the post data, the process proceeds to step S862. When the loop control variable i has become greater than the size of the attribute information list (the total number of lines) included in the post data, the CPU 101 ends the present control. In step S862, the CPU 101 determines whether or not the i-th item in the attribute information list included in the post data is attribute information about the date and time of the submission deadline for the assignment. When the CPU 101 determines that the i-th item in the attribute information list included in the post data is not attribute information about the date and time of the submission deadline for the assignment, the process proceeds to the step S863. In the step S863, the CPU 101 increments the loop control variable i by one. The process then returns to the step S861. Thus, the CPU 101 can search the attribute information list in FIG. 8D, which is included in the post data, for an attribute information name in order from the top. When the CPU 101 determines that the i-th item in the attribute information list included in the post data is attribute information about the date and time of the submission deadline for the assignment, the process proceeds to step S864. In the step S864, the CPU 101 can obtain attribute information corresponding to the i-th item in the attribute information list included in the post data as the attribute information about the date and time of the submission deadline for the assignment. The CPU 101 then ends the present control. After the CPU 101 completes the submission deadline obtaining process, the process proceeds to the step S807.

Figure 9D:
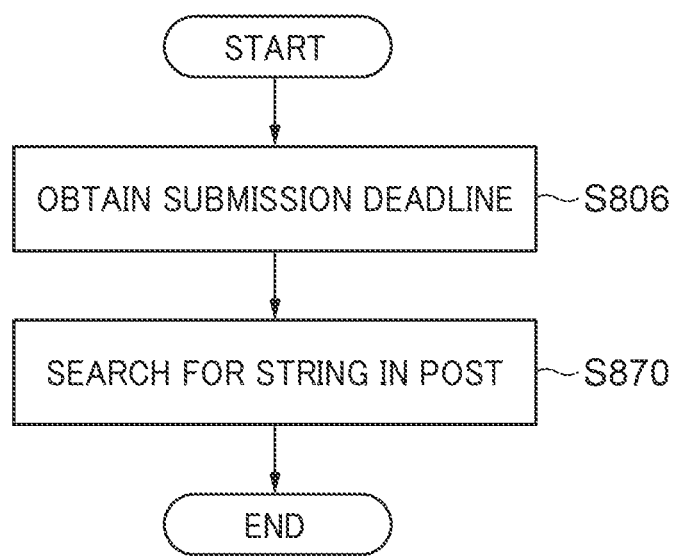
FIG. 9D is a flowchart illustrating a third example of the submission deadline obtaining process in FIG. 9A.

FIG. 9D is a flowchart illustrating a third example of the submission deadline obtaining process in FIG. 9A. The CPU 101 begins the submission deadline obtaining process in FIG. 9D with the process of step S806, of obtaining the assignment submission deadline, and then searches for a string included in the post data in step S870. The post data includes strings of text data such as a tile, text, and submission deadline as illustrated in FIG. 8D. The CPU 101 can search for a specific string such as "Submission Deadline" and obtain a string in the text data following the retrieved specific string as attribute information indicating the date and time of the submission deadline. The CPU 101 then ends the present control. After the CPU 101 completes the submission deadline obtaining process, the process proceeds to the step S807.

Thus, in the step S806 in FIG. 9A, the CPU 101 can obtain attribute information indicating the date and time of the submission deadline for the assignment by performing at least one of the control processes in FIGS. 9B to 9D in the step S806 in FIG. 9A.

As described above, to print a file stored in the learning management system 140, the multifunction peripheral 100 according to the present embodiment obtains post data relating to the file and generates print data for printing the file including post information (a submission deadline for an assignment) included in the post data. The multifunction peripheral 100 then causes the printing unit 110 to print the print data for the file including the post information. Thus, related information that is not included in the file of the assignment such as the submission deadline for the assignment as well as the contents of the assignment is printed on printed matter of the assignment. For example, the submission deadline for the assignment is printed on the printed matter of the assignment even if the teacher has not updated the file of the assignment for the purpose of adding the submission deadline. It allows a student who receives the printed matter of the assignment to recognize the submission deadline for the assignment by seeing the printed matter. Thus, in the present embodiment, to print a file stored in the learning management system 140, the multifunction peripheral 100 adds post information included in post data relating to the file to print data for the printing file and prints the print data. It should be noted that a file to be printed in the present embodiment should not always be a file of an assignment but may be a file of a work or any content that was submitted to a posting service with additional information such as a predetermined submission deadline being specified for the file, stored in the learning management system 140. As a result, in the present embodiment, through enhanced coordination between the multifunction peripheral 100 and the learning management system, the multifunction peripheral 100 can perform printing highly convenient for users. On the other hand, assuming that, for example, a post is printed separately from a file, a user such as a student needs to associate printed matter of the post and printed matter of the file with each other by herself or himself after printing them separately. In the present embodiment, additional information such as a submission deadline for an assignment is printed collectively on printed matter of a file itself, and hence it is unnecessary for a user to associate printed matter of a file and printed matter of a post with each other by checking them against each other.

Second Embodiment

A description will now be given of a multifunction peripheral 100 that is a processing apparatus according to a second embodiment of the present invention. Differences from the above described first embodiment will be described mainly below. In the first embodiment described above, an image in a file of an assignment and a submission deadline for the assignment are collectively printed. In the present embodiment described below, in a case where the post type of post data is other than an assignment, an image in a file for the post type other than an assignment and additional information therefor are collectively printed. In the learning management system 140, for example, communication and sharing of materials as well as assignments are preferred. Types of post data such as assignments, notices, and materials are indicated in the content selection screen 630 in FIG. 7B. In the present embodiment, a post type is identified from among a plurality of post types, and additional information corresponding to the post type is obtained.

Figure 10A:
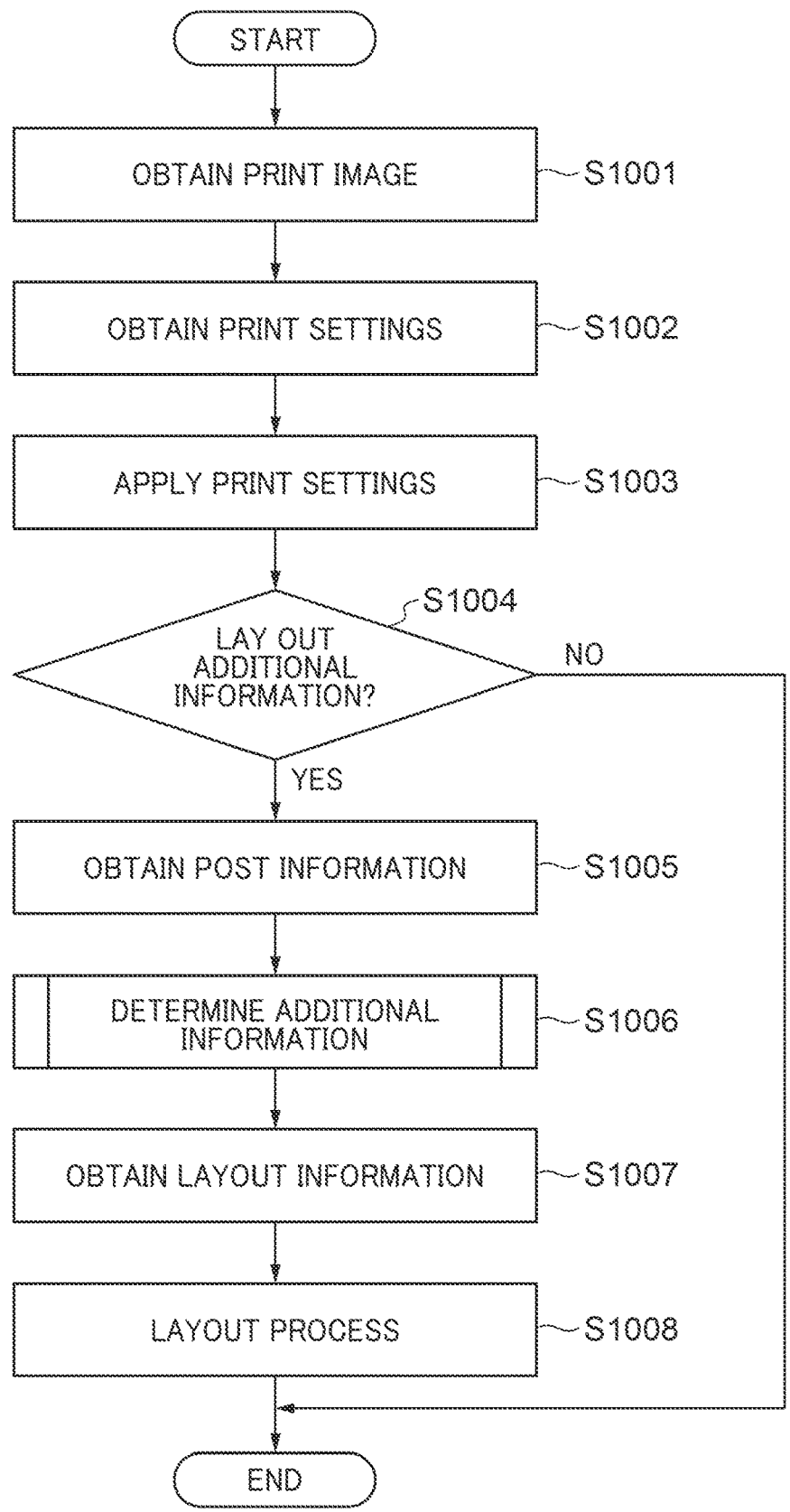
FIG. 10A is a flowchart of a print data generating process that is carried out using a print control unit in a multifunction peripheral in FIG. 1 according to a second embodiment.

FIG. 10A is a flowchart of a print data generating process in the multifunction peripheral 100 according to the second embodiment. FIG. 10A corresponds to FIG. 9A. The CPU 101 of the multifunction peripheral 100 acts as a print data generating unit to carry out the print data generating process in FIG. 10A. The CPU 101 may carry out the print data generating process in FIG. 10A in a case where a setting that will lay out additional information and print the additional information together with an image in a file has been made. The CPU 101 may also carry out the print data generating process in FIG. 10A in a case where a setting that will automatically lay out additional information and print the additional information together with an image in a file has been made and in a case where a setting that will print an image in a file without laying out additional information has been made. Processes in steps S1001 to S1005 can be the same as those in the steps S801 to S805 in FIG. 9A.

In step S1006, the CPU 101 searches obtained post data to determine a type of the obtained post data. According to the determined type of the obtained post data, the CPU 101 obtains additional information to be automatically laid out together with an image in a file. In step S1007, according to the determined type of the obtained post data, the CPU 101 obtains layout information on additional information corresponding to the type of the post data. It should be noted that layout information on additional information may be fixed with respect to each type of the post data, may be selected by a user from among a plurality of templates stored in advance in the multifunction peripheral 100, or may be created by a user. In step S1008, the CPU 101 adds the additional information obtained from the post data to the print data, which was generated in the step S1003, in the obtained layout. Thus, the CPU 101 can generate the print data including the additional information included in the post data together with the image data in the file. The CPU 101 then ends the present control. Thus, the CPU 101 can act as a type determination unit to determine a type of post data.

Figure 10B:
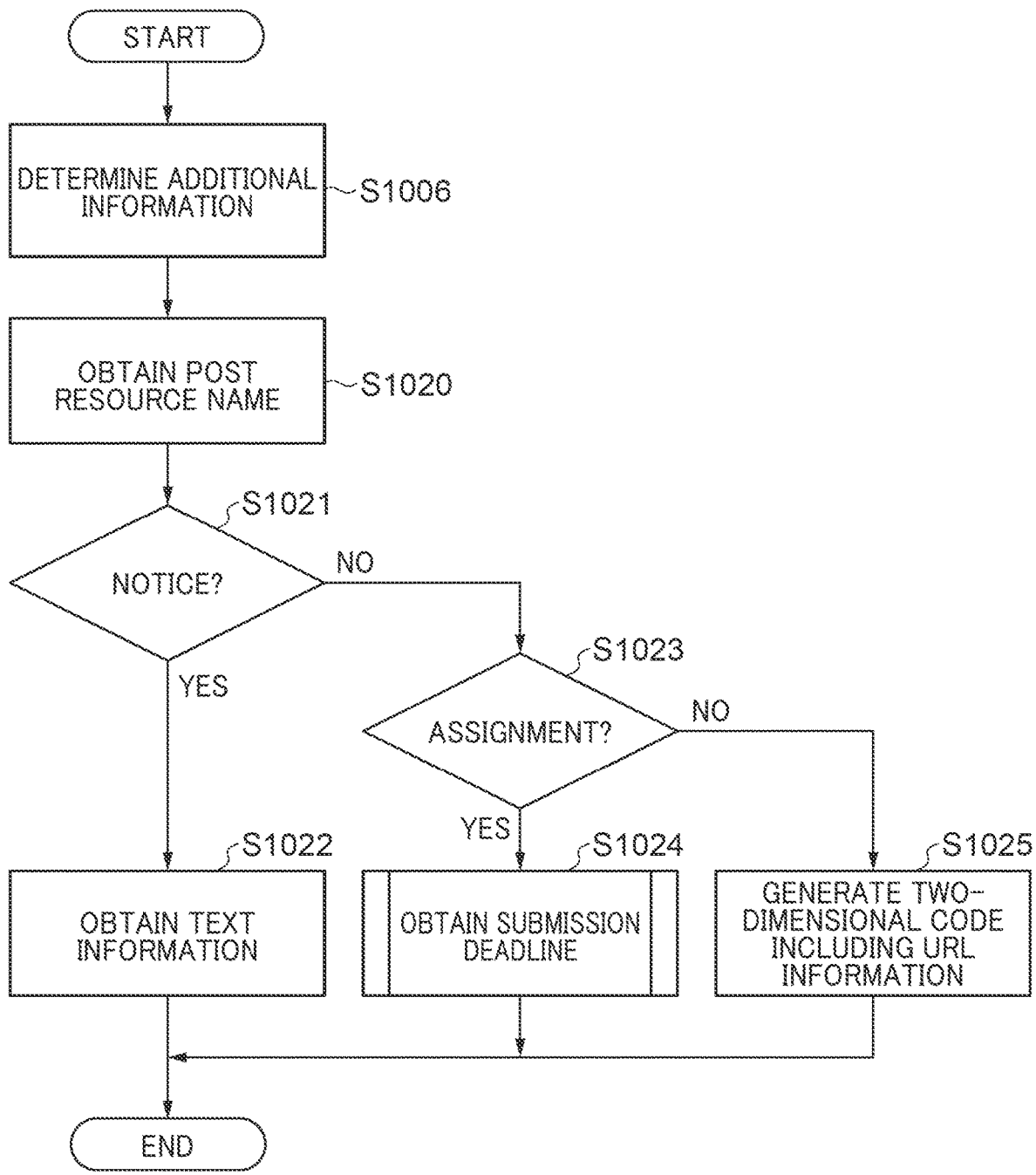
FIG. 10B is a flowchart illustrating an example of an additional information determination process in FIG. 10A.

FIG. 10B is a flowchart illustrating an example of the additional information determination process in FIG. 10A. The CPU 101 begins the additional information determination process in FIG. 10B with the determination process in the step S1006, followed by the process proceeding to step S1020. In the step S1020, the CPU 101 obtains a resource name of post data. The CPU 101, for example, follows a hierarchy in the data structure in FIG. 3 to obtain a class, to which post data related to processing belongs, as a resource name. In step S1021, the CPU 101 determines whether or not the obtained resource name of the post data, that is, the class to which the post data belongs is "Notice". When the CPU 101 determines that the class to which the post data belongs is "Notice", the process proceeds to step S1022. When the CPU 101 determines that the class to which the post data belongs is not "Notice", the process proceeds to step S1023. In the step S1022, the CPU 101 obtains text data such as a main body from the post data. The CPU 101 then ends the present control, followed by the process proceeding to the step S1007 in FIG. 10A, in which the CPU 101 adds the obtained text data as additional information to the print data. An image in a file relating to the post data and the text data included in the post data are collectively laid out and printed on printed matter.

In the step S1023, the CPU 101 determines whether or not the obtained resource name of the post data, that is, the class to which the post data belongs is "Assignment". When the CPU 101 determines that the class to which the post data belongs is "Assignment", the process proceeds to step S1024. When the CPU 101 determines that the class to which the post data belongs is not "Assignment", the process proceeds to step S1025. In the step S1024, the CPU 101 obtains text data of a submission deadline for an assignment from the post data. In the process in the step S1024, as with the step S806 in FIG. 9A, the CPU 101 should carry out at least one of the processes in FIGS. 9B to 9D. After that, the CPU 101 ends the present control, followed by the process proceeding to the step S1007 in FIG. 10A, in which the CPU 101 adds the obtained text data as additional information to the print data. An image of the assignment in a file relating to the post data and the text data included in the post data are collectively laid out and printed on printed matter. In the step S1025, the CPU 101 obtains a link such as a URL included in the post data and generates a two-dimensional code for the link. The CPU 101 then ends the present control, followed by the process proceeding to the step S1007 in FIG. 10A, in which the CPU 101 adds the two-dimensional code for the link as additional information to the print data. An image in a file relating to the post data and the two-dimensional code for the link included in the post data are collectively laid out and printed on printed matter.

As described above, in the step S1021 and the step S1023, the CPU 101 of the multifunction peripheral 100 can act as the type determination unit to determine whether the post type of post data is a notice, an assignment, or other. Moreover, in the step S1022, the step S1024, and the step S1025, the CPU 101 can add additional information, which varies with post types of post data, to print data for printing a file stored in the learning management system 140. Further, to print image data in a file stored in the learning management system 140, the CPU 101 of the multifunction peripheral 100 can also perform printing using the printing unit 110 based on print data including additional information on the post data.

Figure 11A:
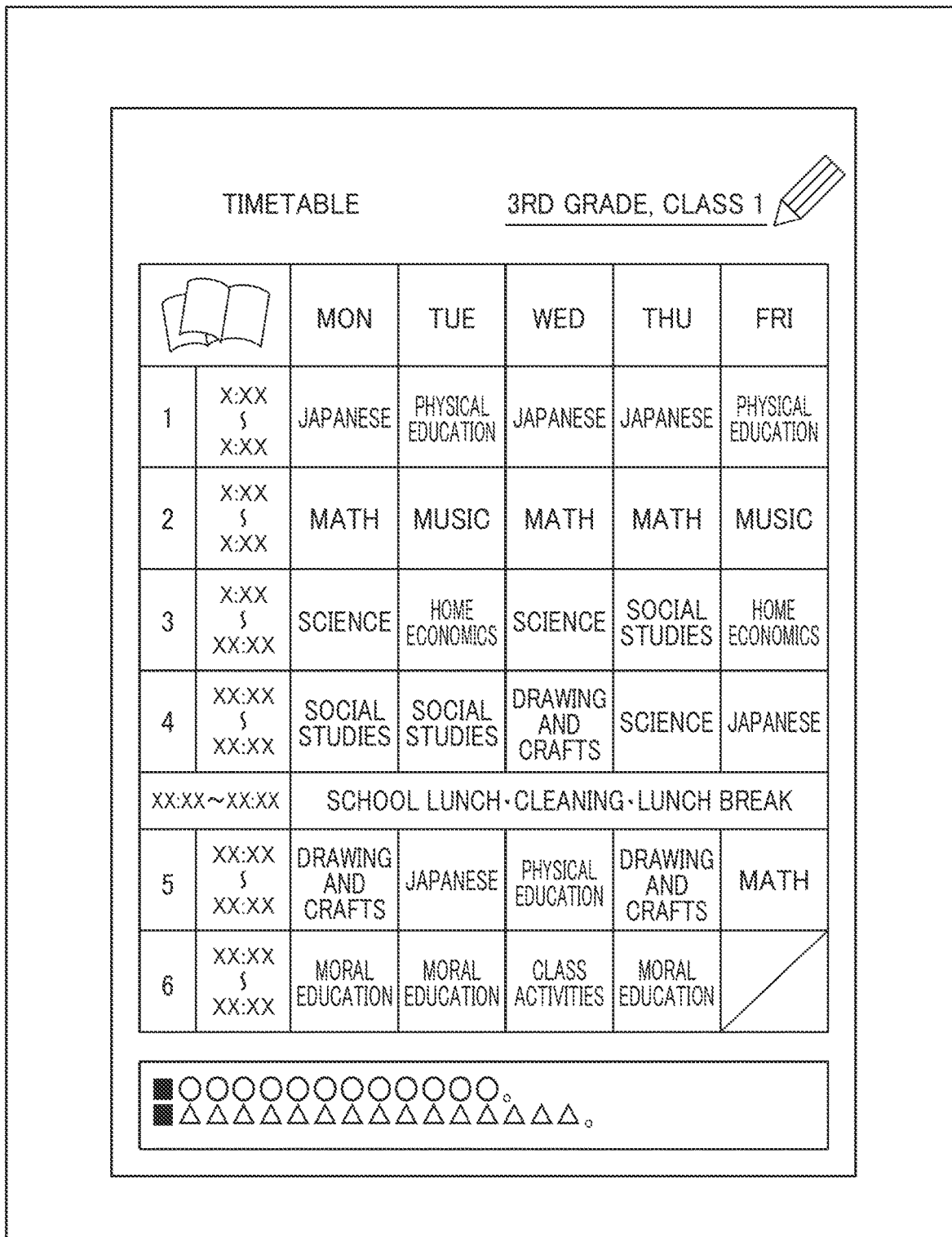
FIG. 11A is a view useful in explaining printed matter of a file of a timetable stored in the learning management system.
Figure 11B:
FIG. 11B is a view useful in explaining a display screen for post information in post data relating to the file in FIG. 11A, which is viewable on the operation unit of the multifunction peripheral in FIG. 1.

FIG. 11A is a view useful in explaining printed matter of a file of a timetable stored in the learning management system 140. FIG. 11B is a view useful in explaining a display screen for post information in post data relating to the file of the timetable in FIG. 11A, which is viewable on the operation unit 105 of the multifunction peripheral 100 in FIG. 1. FIG. 11C is a view useful in explaining printed matter of the file of the timetable stored in the learning management system 140, printed together with the post information in the post data in FIG. 11B.

An image of the timetable, which is a content of the file, is printed on the printed matter in FIG. 11A. A text of a message is indicated as post information in post data in the display screen for post information in FIG. 11B. Here, information about a change to a normal timetable is displayed as the text data of the message. A thumbnail image for the file of the timetable in FIG. 11A relating to the post data is displayed in the display screen for post information. When a setting that will automatically lay out additional information has been made, the CPU 101 obtains the text data of the message from the post data in FIG. 11B and adds the obtained text data of the message to print data for the printed matter in FIG. 11A. Thus, the multifunction peripheral 100 can create the printed matter of the timetable including a notice in FIG. 11C. The timetable and the change to it are collectively printed on the printed matter in FIG. 11C.

Figure 11D:
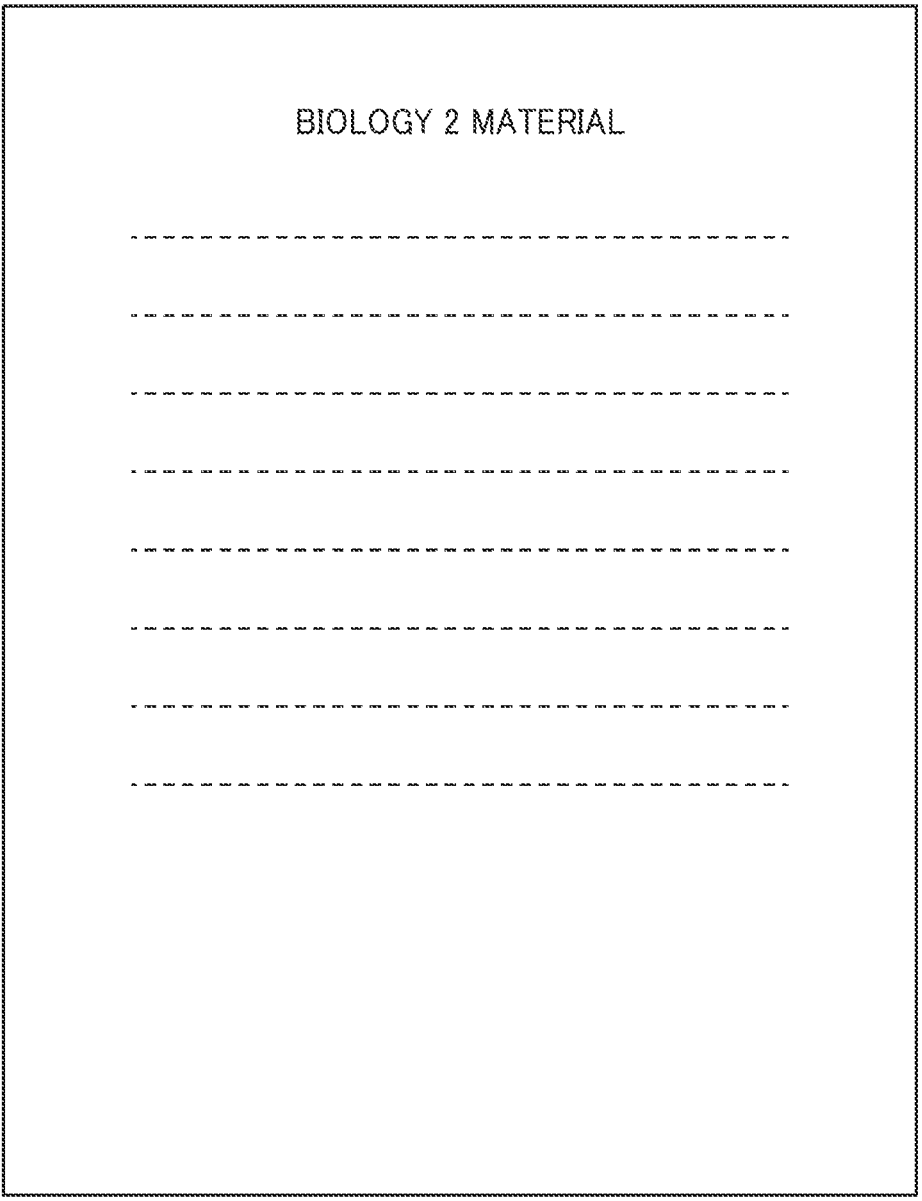
FIG. 11D is a view useful in explaining printed matter of a file of a lecture material stored in the learning management system.
Figure 11E:
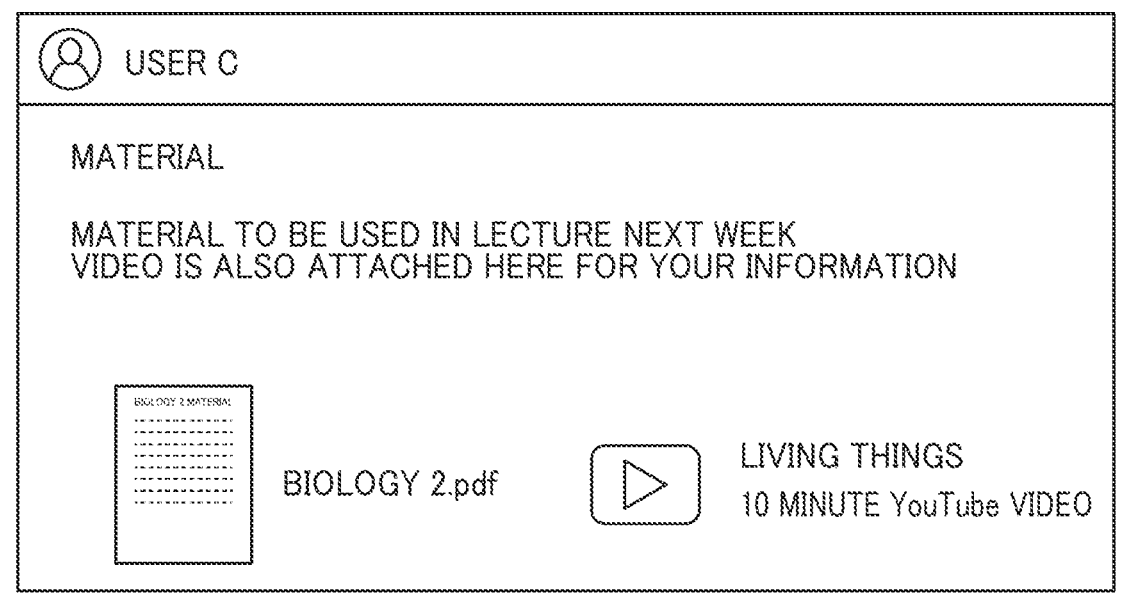
Figure 11F:
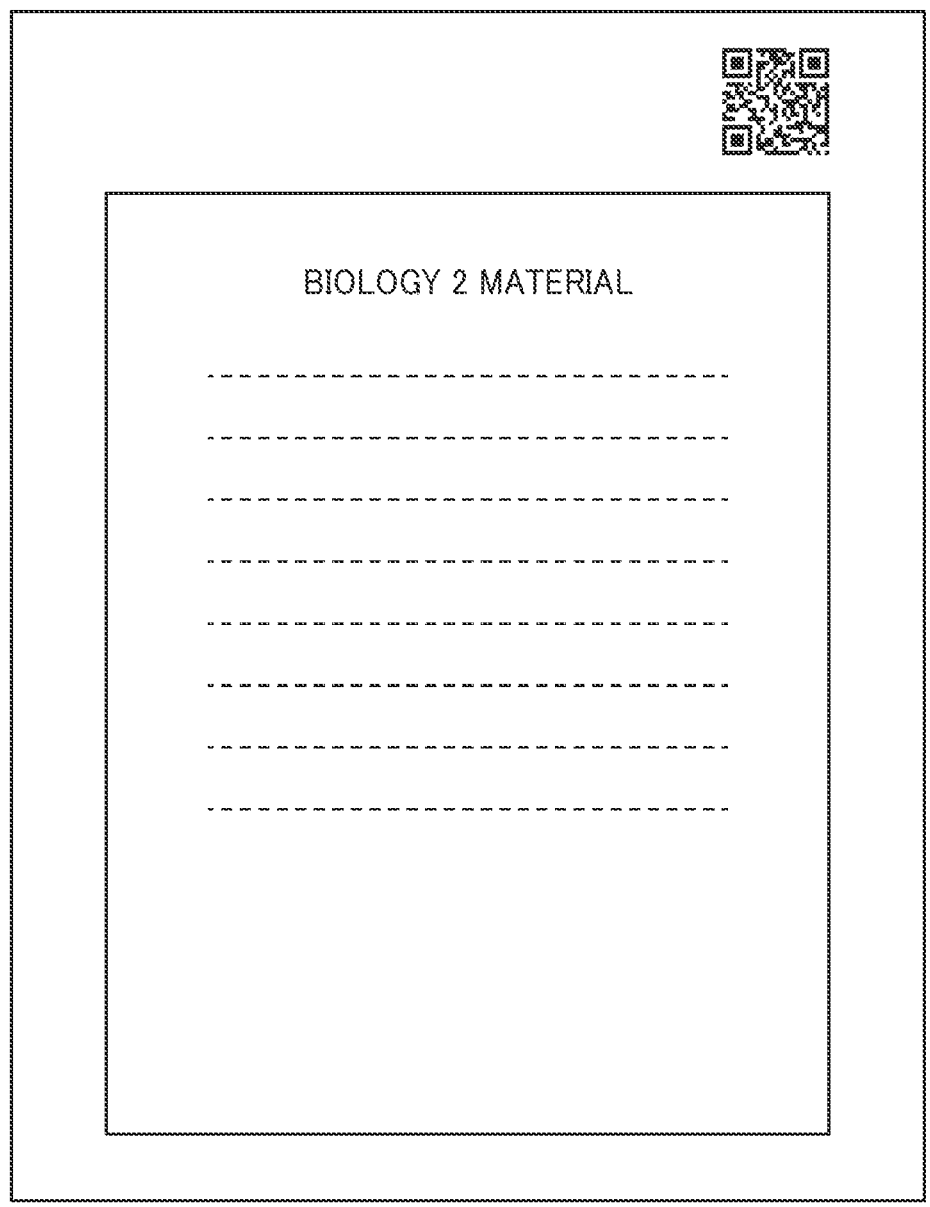
FIG. 11F is a view useful in explaining printed matter of a file of a lecture material stored in the learning management system, printed together with the post information in the post data in FIG. 11E.

FIG. 11D is a view useful in explaining printed matter of a file of a lecture material stored in the learning management system 140. The printed matter in FIG. 11D can be a lecture material for a unit of study. FIG. 11E is a view useful in explaining a display screen for post information in post data relating to the file in FIG. 11D, which is viewable on the operation unit 105 of the multifunction peripheral 100 in FIG. 1. FIG. 11F is a view useful in explaining printed matter of the file of the lecture material stored in the learning management system 140, printed together with the post information in the post data in FIG. 11E.

An image of the lecture material, which is a content of the file, is printed on the printed matter in FIG. 11D. In the display screen for post information in FIG. 11E, a text telling that the lecture material is distributed is displayed as the post information in the post data. A thumbnail image for the file of the lecture material in FIG. 11A relating to the post data and a link to a Web page which can help understand the lecture material are displayed in the display screen for post information. When a setting that will automatically lay out additional information has been made, the CPU 101 obtains the link to the Web page from the post data in FIG. 11E, encodes it into a two-dimensional code, and adds it to print data for the printed matter in FIG. 11A. Thus, the multifunction peripheral 100 can generate the printed matter of the lecture material and the link to the Web page that can help understand the lecture material are collectively printed on the printed matter in FIG. 11F.

As described above, in the present embodiment, it is possible to not only collectively print an assignment and a submission deadline for it but also collectively print a timetable and a change to it or collectively print a lecture material and a URL for helping understand it. Moreover, in the present embodiment, it is possible to add and print additional information using print settings varying according to contents of post data.

Third Embodiment

A description will now be given of a multifunction peripheral 100 that is a processing apparatus according to a third embodiment of the present invention. Differences from the embodiments described above will be described mainly below.

Figure 12A:
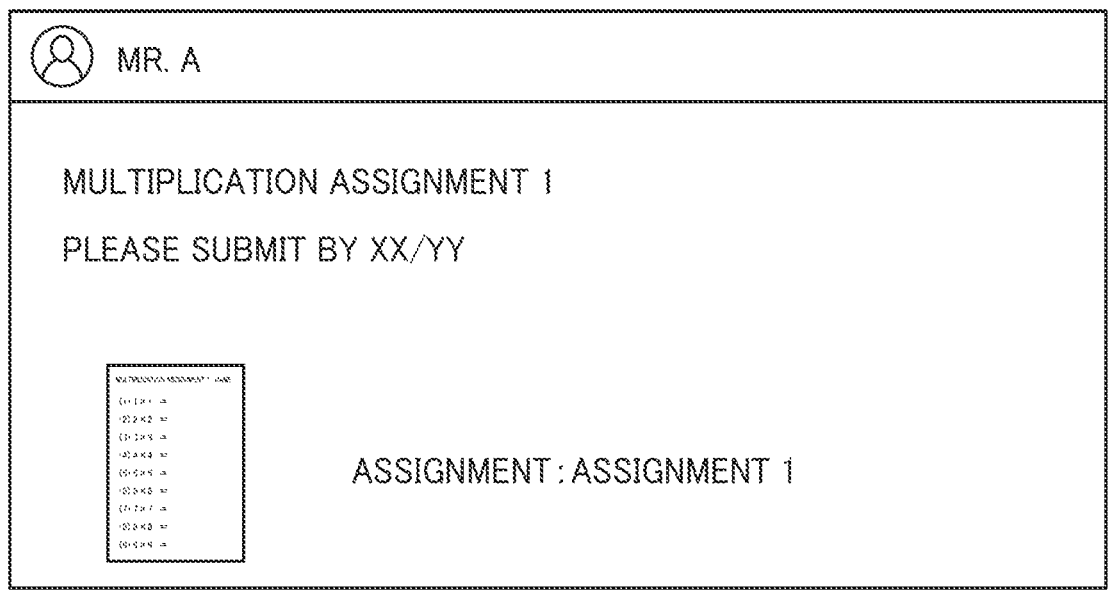
FIG. 12A is a view useful in explaining a display screen for post data, from which additional information can be determined by an additional information determination process in FIG. 13.
Figure 12B:
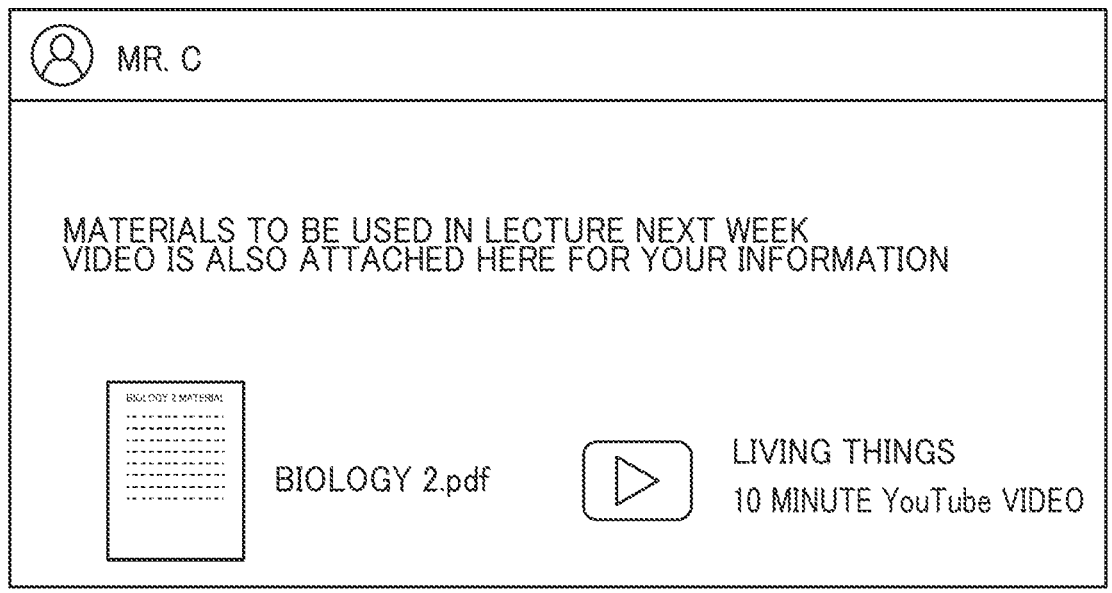
FIG. 12B is a view useful in explaining a display screen for other post data, from which additional information can be determined by the additional information determination process in FIG. 13.
Figure 13:
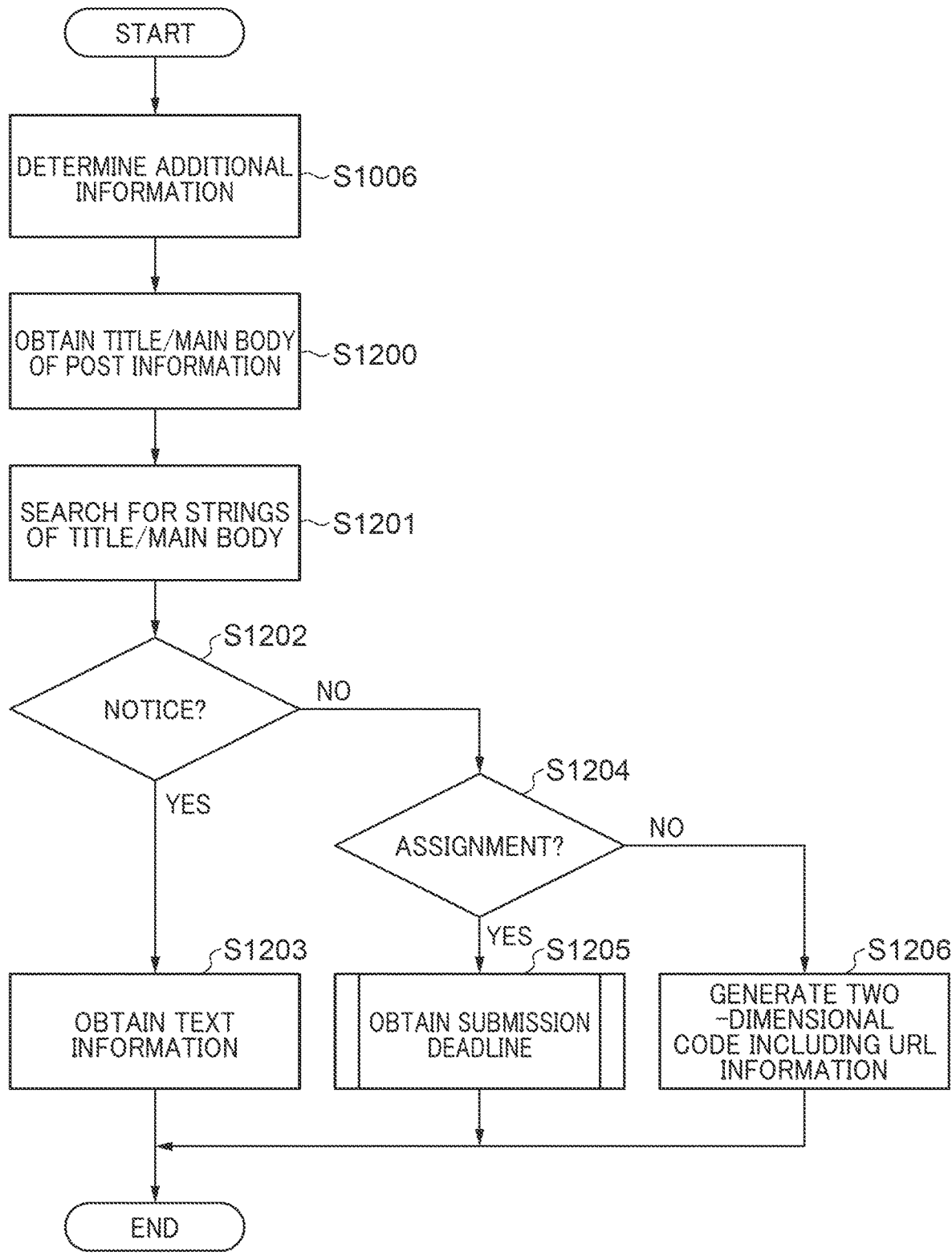
FIG. 13 is a flowchart of the additional information determination process that is carried out by a multifunction peripheral according to a third embodiment.

FIG. 12A is a view useful in explaining a display screen for post data, from which additional information can be determined by an additional information determination process in FIG. 13. FIG. 12B is a view useful in explaining a display screen for other post data, from which additional information can be determined by the additional information determination process in FIG. 13. The post data displayed in these display screens does not include any information that can identify a type of a post. For this reason, it is difficult for the CPU 101 of the multifunction peripheral 100 to determine information on the post data through the additional information determination process in FIG. 10B in the embodiments described above.

FIG. 13 is a flowchart illustrating an example of the additional information determination process that is carried out by the multifunction peripheral 100 according to the third embodiment. In the additional information determination process in FIG. 10A, the CPU 101 of the multifunction peripheral 100 may perform the control in FIG. 13. The CPU 101 begins the additional information determination process in FIG. 13 with the determination process in the step S1006, followed by the process proceeding to step S1200.

In the step S1200, the CPU 101 extracts and obtains text data such as a title and a main body from post data. In step S1201, the CPU 101 searches the text data obtained from the post data for strings. For example, the CPU 101 searches the text data obtained from the post data by reference strings such as "Notice" and "Assignment" for post types desired to be classified. In step S1202, the CPU 101 determines whether or not the text data retrieved from the post data has been searched for the string "Notice". When the CPU 101 determines that the string "Notice" has been searched for, the process proceeds to step S1203. When the CPU 101 determines that the string "Notice" has not been searched for, the process proceeds to step S1204. In the step S1203, the CPU 101 obtains text data about a notice from the post data. Then, the CPU 101 ends the present control, and the process proceeds to the step S1007 in FIG. 10A, in which the CPU 101 adds the obtained text data as additional information to the print data. The text included in the post data and, for example, an image in a file relating to the post data are collectively laid out and printed on printed matter.

In the step S1204, the CPU 101 determines whether or not the text data obtained from the post data has been searched for the string "Assignment". When the CPU 101 determines that the string "Assignment" has been searched for, the process proceeds to step S1205. When the CPU 101 determines that the string "Assignment" has not been searched for, the process proceeds to step S1206. In the step S1205, the CPU 101 obtains text data on a submission deadline for an assignment from the post data. In the process in the step S1205, the CPU 101 should carry out at least one of the processes in FIGS. 9B to 9D as in the step S806 in FIG. 9A. Then, the CPU 101 ends the present control, and the process proceeds to the step S1007 in FIG. 10A, in which the CPU 101 adds the obtained text data as additional information to the print data. The submission deadline for the assignment included in the post data and an image of the assignment in a file relating to the post data are collectively laid out and printed on printed matter. In the step S1206, the CPU 101 obtains a link such as a URL included in the post data and generates a two-dimensional code for the link. The CPU 101 then ends the present control, followed by the process proceeding to the step S1007 in FIG. 10A, in which the CPU 101 adds the two-dimensional code for the link as additional information to the print data. An image in a file relating to the post data and the two-dimensional code for the link included in the post data are collectively laid out and printed on printed matter.

As described above, in the step S1202 and the step S1204, the CPU 101 of the multifunction peripheral 100 can act as the type determination unit to determine whether the post type of post data is a notice, an assignment, or other. Moreover, in the step S1203 and the step S1205, and the step S1206, the CPU 101 can add additional information, which varies with post types of post data, to print data for printing a file of an assignment. Further, to print image data in a file stored in the learning management system 140, the print control unit 109 of the multifunction peripheral 100 can also perform printing of print data including additional information on the post data.

As described above, in the present embodiment, even if post data itself has no information on its type, text data in the post data is searched, and additional information varying corresponding to post data can be added and printed based on print settings varying corresponding to post data.

Other Embodiments

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

In the embodiments described above, the CPU 101 prints additional information, which is obtained from post data, on the same page as image data on printed matter relating to the post data. Alternatively, for example, the CPU 101 may print additional information, which is obtained from post data, on a different page from image data on printed matter relating to the post data. The different page may be printed on a sheet different from a sheet on which the image data is printed or may be printed on the back of the sheet on which the image data is printed.

In the embodiments described above, when there is post data, the CPU 101 obtains text data of additional information such as a submission deadline for an assignment from the post data. Alternatively, for example, when there is post data, the CPU 101 may determine whether or not contents of the post data are suitable as a source from which additional information is to be obtained. Only when the post data is suitable as the source, the CPU 101 may obtain text data of additional information from the post data. When the post data is not suitable as the source, the CPU 101 may prompt a user to cancel printing or may provide notification to the user.

In the embodiments described above, in accordance with operations on the operation unit 105 of the multifunction peripheral 100, the CPU 101 starts to generate various types of print data described above and performs printing. Alternatively, for example, when parental notification is enabled in the multifunction peripheral 100, the CPU 101 may accumulate print data for post data about, for example, communication to each student in the multifunction peripheral 100. The CPU 101 may print the accumulated print data in accordance with operations on the operation unit 105 by a parent.

This application claims the benefit of Japanese Patent Application No. 2021-136433 filed on Aug. 24, 2021 which is hereby incorporated by reference wherein in its entirety.

What is claimed is:

1. A multifunction peripheral communicable with a server, the multifunction peripheral comprising:
   a printing unit; and
   a processor configured to:
      transmit a request for an assignment to the server;
      receive from the server, as a response to the request, a file corresponding to the assignment and data indicating a deadline, which is stored in association with the assignment; and
      cause the printing unit to print the received file and the deadline indicated by the received data upon receiving the file and the data by:
         setting for printing of the received file together with the deadline, and generating print data for printing the file together with the deadline; and
         performing printing of the print data via the printing unit.

2. The multifunction peripheral according to claim 1, wherein the processor is further configured to add the deadline in a header of an image to be printed based on the file.

3. The multifunction peripheral according to claim 1, wherein the processor is further configured to:
   add additional information corresponding to a type of the received data to print data generated based on the received file; and
   cause the printing unit to print the print data.

4. The multifunction peripheral according to claim 1, wherein the processor is further configured to:
   determine a type of the received data;
   add additional information corresponding to the determined type to print data generated based on the received file; and
   cause the printing unit to print the print data.

5. The multifunction peripheral according to claim 1, wherein the processor is further configured to:
   determine whether a type of the received data is a notice, the assignment, or other;
   add additional information varying according to the determined type to print data generated based on the received file; and
   cause the printing unit to print the print data.

6. The multifunction peripheral according to claim 1, wherein the processor is further configured to, in a state where a type of the received data is a notice:
   obtain text information from the received data;
   add the obtained text information to print data generated based on the file; and
   cause the printing unit to print the print data.

7. The multifunction peripheral according to claim 1, wherein the processor is further configured to, in a state where post information in the received data includes a link:
   obtain and encode information on the link;
   add the encoded information on the link to print data generated based on the received file; and
   cause the printing unit to print the print data.

8. A control method for a multifunction peripheral that includes a printing unit and communicable with a server, the control method comprising:
   transmitting a request for an assignment to the server;
   receiving from the server, as a response to the request, a file corresponding to the assignment and data indicating a deadline, which is stored in association with the assignment; and
   printing the received file and the deadline indicated by the received data upon receiving the file and the data by:
      setting for printing of the received file together with the deadline, and generating print data for printing the file together with the deadline; and
      performing printing of the print data via the printing unit.

9. A non-transitory computer-readable storage medium storing a program executable by a computer to execute a control method for a multifunction peripheral that includes a printing unit and communicable with a server, the control method comprising:
transmitting a request for an assignment to the server;
receiving from the server, as a response to the request, a file corresponding to the assignment and data indicating a deadline, which is stored in association with the assignment; and
printing the received file and the deadline indicated by the received data upon receiving the file and the data by:
setting for printing of the received file together with the deadline, and generating print data for printing the file together with the deadline; and
performing printing of the print data via the printing unit.

* * * * *